US010305907B2

(12) United States Patent
Sriramakrishnan

(10) Patent No.: US 10,305,907 B2
(45) Date of Patent: May 28, 2019

(54) COMPUTER DEVICE AND METHOD FOR CONTROLLING ACCESS TO A WEB RESOURCE

(71) Applicant: Avecto Limited, Manchester (GB)

(72) Inventor: Sarma Sriramakrishnan, Warrington (GB)

(73) Assignee: Avecto Limited, Manchester (GB)

( * ) Notice: Subject to any disclaimer, the term of this patent is extended or adjusted under 35 U.S.C. 154(b) by 164 days.

(21) Appl. No.: 15/405,567

(22) Filed: Jan. 13, 2017

(65) Prior Publication Data
US 2017/0208067 A1    Jul. 20, 2017

(30) Foreign Application Priority Data

Jan. 14, 2016  (GB) .................. 1600738.7

(51) Int. Cl.
*H04L 29/06* (2006.01)
*H04L 29/08* (2006.01)
*G06F 21/62* (2013.01)

(52) U.S. Cl.
CPC .......... *H04L 63/10* (2013.01); *G06F 21/6218* (2013.01); *H04L 63/0281* (2013.01); *H04L 63/102* (2013.01); *H04L 67/28* (2013.01); *H04L 67/02* (2013.01)

(58) Field of Classification Search
CPC ... H04L 63/10; H04L 63/102; H04L 63/0281; H04L 67/28; H04L 67/02; G06F 21/6218
See application file for complete search history.

(56) References Cited

U.S. PATENT DOCUMENTS

| | | | | |
|---|---|---|---|---|
| 6,256,739 B1* | 7/2001 | Skopp | .............. | G06F 21/31 709/229 |
| 6,564,327 B1* | 5/2003 | Klensin | .............. | G06F 21/6218 726/19 |
| 7,133,904 B1* | 11/2006 | Sohya | .............. | G06F 17/30899 709/218 |
| 7,587,499 B1* | 9/2009 | Haghpassand | .......... | G06F 21/50 370/229 |
| 8,079,087 B1 | 12/2011 | Spies et al. | | |
| 8,527,631 B1* | 9/2013 | Liang | .............. | H04L 63/12 709/225 |
| 8,700,895 B1* | 4/2014 | Naguib | .............. | G06F 21/6218 713/1 |
| 8,972,590 B2* | 3/2015 | Haghpassand | .......... | G06F 21/50 709/229 |
| 9,172,705 B1* | 10/2015 | Kong | .............. | H04L 47/801 |
| 2003/0014659 A1* | 1/2003 | Zhu | .............. | G06F 17/30867 726/13 |
| 2004/0015725 A1* | 1/2004 | Boneh | .............. | H04L 63/166 713/160 |

(Continued)

*Primary Examiner* — James R Turchen
(74) *Attorney, Agent, or Firm* — Coats & Bennett, PLLC

(57) ABSTRACT

Web resources are accessible by a process on a computer device. Access to the web resources is controlled by a web proxy running in an address space of the process. The web proxy receives a web request for a web resource from the process. The web proxy examines the web request for the web resource and selectively allows or denies access to the web resource. If the web request for the web resource is allowed, the web proxy arranges access to the web resource, for example, directly via an operating system of the computer device or via a registered web proxy.

19 Claims, 17 Drawing Sheets

(56) References Cited

U.S. PATENT DOCUMENTS

| | | | |
|---|---|---|---|
| 2004/0073634 A1* | 4/2004 | Haghpassand | G06F 21/50 709/220 |
| 2006/0021031 A1 | 1/2006 | Leahy et al. | |
| 2009/0198724 A1* | 8/2009 | Valimaki | G06F 17/3089 |
| 2010/0083383 A1 | 4/2010 | Adler et al. | |
| 2011/0283366 A1* | 11/2011 | Kwon | G06F 21/54 726/29 |
| 2014/0108351 A1* | 4/2014 | Nallathambi | G06F 17/30088 707/639 |
| 2014/0331119 A1* | 11/2014 | Dixon | H04L 63/168 715/234 |
| 2015/0222512 A1* | 8/2015 | Kay | G06F 11/30 709/224 |
| 2016/0119288 A1* | 4/2016 | Ardeli | H04L 63/1416 726/12 |
| 2016/0330125 A1* | 11/2016 | Mekkattuparamban | H04L 47/20 |
| 2017/0103201 A1* | 4/2017 | Fox | G06F 21/566 |

* cited by examiner

COMPUTER DEVICE AND METHOD FOR CONTROLLING ACCESS TO A WEB RESOURCE

CROSS REFERENCE TO RELATED APPLICATIONS

This application claims priority under 35 U.S.C. § 119 to Application No. 1600738.7 filed Jan. 14, 2016 in United Kingdom, the entire disclosure of which is incorporated by reference herein.

BACKGROUND

Technical Field

The present invention relates generally to the field of computers and computer devices. More particularly, the present invention relates to a computer device and a method for controlling access to a web resource.

Description of Related Art

As is well recognized in the field of computer security, there is an on-going need to protect computer devices from malicious content. In particular, it is desired to protect the computer devices from malicious content which may be introduced or propagated by actions of a user, such as accessing web resources on the Internet. While some of the web resources may be trusted, other untrusted web resources may comprise malicious content.

In the related art, it is known to isolate untrusted content by limiting access to web resources from certain computer devices (e.g. 'blacklists' and 'whitelists' of particular URLs). A difficulty arises, however, in that these isolation mechanisms typically preclude all access, including legitimate access, to the content, resources or sites which are deemed to be potentially untrusted. Further, these known mechanisms typically do not differentiate between access to the web resources initiated by user actions and access to the web resources initiated programmatically, for example by processes or applications running on the computer devices. In other words, protecting the computer devices from malicious content tends to then inhibit or deny legitimate access to desired web resources. Conversely, relaxing the isolation mechanisms, so as to allow access to the web resources, may expose the computer devices to malicious content. Hence, there is still a need to control access to the web resources whilst robustly and effectively isolating malicious content.

The example embodiments have been provided with a view to addressing at least some of the difficulties that are encountered in current computer devices and computer networks, whether those difficulties have been specifically mentioned above or will otherwise be appreciated from the discussion herein.

SUMMARY

According to the present invention there is provided a computer system, a method and a computer-readable storage medium as set forth in the appended claims. Additional features of the invention will be apparent from the dependent claims, and the description which follows.

There now follows a summary of various aspects and advantages according to embodiments of the invention. This summary is provided as an introduction to assist those skilled in the art to more rapidly assimilate the detailed discussion herein and is not intended in any way to limit the scope of the claims that are appended hereto.

In one example there is described a computer device, comprising: a hardware layer including a processor and a memory; an operating system, executed by the hardware layer, configured to access web resources in response to web requests; a process configured to run in an allocated address space in the memory; a web proxy provided in the allocated address space of the process, wherein the web proxy is configured to: receive a web request for a web resource from the process; examine the web request for the web resource to selectively allow or deny access to the web resource; and arrange access to the web resource, when the web request for the web resource is allowed.

In one example, the web proxy may be configured to register with the process as a first web proxy.

In one example, the web proxy may be configured to be invisible to another process configured to run on the computer device and/or another web proxy configured for the computer device.

In one example, the web proxy may be configured to determine a connection origin of the web request; and the web proxy web may be configured to examine the request for the web resource to selectively allow or deny access to the web resource according to the connection origin of the web request.

In one example, the web proxy may be configured to chain with another web proxy configured for the computer device; and wherein access to the web resource may be arranged through the chained web proxies.

In one example, the computer device may comprise an agent configured to provide a sandbox, wherein the sandbox may be configured to isolate untrusted content therein; and wherein access to the web resource may be arranged in the sandbox.

In one example, the computer device may comprise an extension for the process, wherein the extension may be configured to cooperate with the web proxy.

In one example, the extension may be configured to provide context information related to the web request to the web proxy; and the web proxy web may be configured to examine the request for the web resource to selectively allow or deny access to the web resource according to the context information related to the web request.

In one example, the web proxy and the extension may be configured to perform handshakes.

In one example, the web proxy may be configured to selectively examine the web request for the web resource to selectively allow or deny access to the web resource. In one example, the web proxy may be implemented as a Dynamic Link Library (DLL) that may be provided in the allocated address space of the process, for example, by loading the DLL into the allocated address space of the process.

In one example there is described a method for controlling access to web resources on a computer device, the method being implemented by hardware of the computer device including at least a processor and a memory, the method comprising: allocating an address space for a process in the memory; inserting a web proxy in the allocated address space of the process, wherein the web proxy is configured to receive web requests for web resources from the process; receiving, by the web proxy, a web request for a web resource from the process; examining, by the web proxy, the web request for the web resource to selectively allow or deny access to the web resource; and arranging, by the web proxy, access to the web resource, when the web request for the web resource is allowed.

In one example, the method may comprise registering, by the web proxy with the process, as a first web proxy.

In one example, the web proxy may be configured to be invisible to another process configured to run on the computer device and/or another web proxy configured for the computer device In one example, the method may comprise: determining, by the web proxy, a connection origin of the web request; and examining, by the web proxy, the request for the web resource to selectively allow or deny access to the web resource according to the connection origin of the web request.

In one example, the method may comprise: chaining, by the web proxy, with another web proxy configured for the computer device; and wherein arranging, by the web proxy, access to the web resource, when the web request for the web resource is allowed is through the chained web proxies.

In one example, the method may comprise providing, by an agent, a sandbox, wherein the sandbox is configured to isolate untrusted content therein; and wherein arranging, by the web proxy, access to the web resource, when the web request for the web resource is allowed comprises arranging, by the web proxy, access to the web resource, when the web request for the web resource is allowed, in the sandbox.

In one example, the method may comprise cooperating, by an extension provided for the process, with the web proxy.

In one example, the method may comprise providing, by the extension, context information related to the web request to the web proxy; and wherein examining, by the web proxy, the web request for the web resource to selectively allow or deny access to the web resource comprises examining, by the web proxy, the web request for the web resource to selectively allow or deny access to the web resource according to the context information related to the web request.

In one example, the method may comprise performing, by the web proxy and the extension, handshakes.

In one example, the method may comprise examining, by the web proxy, the web request for the web resource to selectively allow or deny access to the web resource comprises selectively examining, by the web proxy, the web request for the web resource to selectively allow or deny access to the web resource.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

At least some of the following example embodiments provide an improved mechanism for controlling access to a web resource from a computer device. The example mechanism is simple and convenient for a user, and is lightweight to implement. Further, the example embodiments are secure in practical implementations while allowing controlled access to the web resource. Many other advantages and improvements will be discussed in more detail herein.

Some of these example embodiments will be discussed in detail in relation to computers and computer devices using the Windows operating system as supplied by Microsoft® Corporation of Redmond, Wash., USA, under the trade marks Windows NT®, Windows 2000®, Windows XP®, Windows Vista®, Windows Server® 2003, Windows Server® 2008, Windows® 7, Windows® 8, Windows® 10 or later versions, amongst others. However, the teachings, principles and techniques of the present invention are also applicable in other practical embodiments. For example, the described embodiments are also applicable to other operating systems, such as UNIX®, Linux®, and iOS®, and in particular those having a discretionary access control security model.

Some of these example embodiments will be discussed in detail in relation to the Chrome® internet browser provided by Google®. However, the teachings, principles and techniques of the present invention are also applicable in other practical embodiments. For example, the described embodiments are also applicable to other internet browsers, such as Internet Explorer® provided by Microsoft® and Firefox® provided by Mozilla®, and other applications that access web resources.

Figure 1:
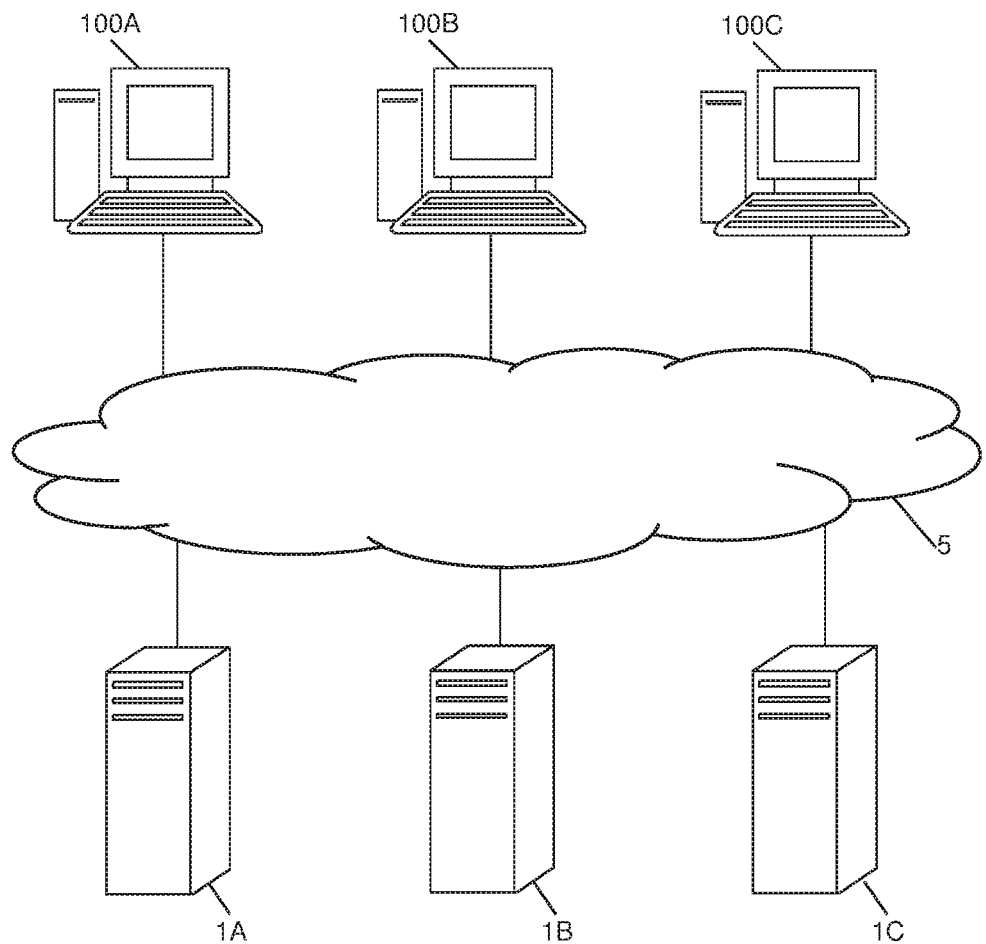
FIG. 1 is a schematic view of an example computer network.

FIG. 1 is a schematic overview of a computer network of a type which may be used in the example embodiments discussed herein. As shown in FIG. 1, computer devices 100A-100C are coupled, via a network 5 (e.g. an intranet, a cloud, the Internet), to servers 1A-1C. In practice, in organizations such as large-scale businesses or corporate environments, tens, hundreds or even thousands of individual user computer devices 100 may be coupled, via the network 5, to thousands of individual servers 1. In this way, web resources on the servers 1A-1C may be accessed from the computer devices 100A-100C via the network 5.

Figure 2:
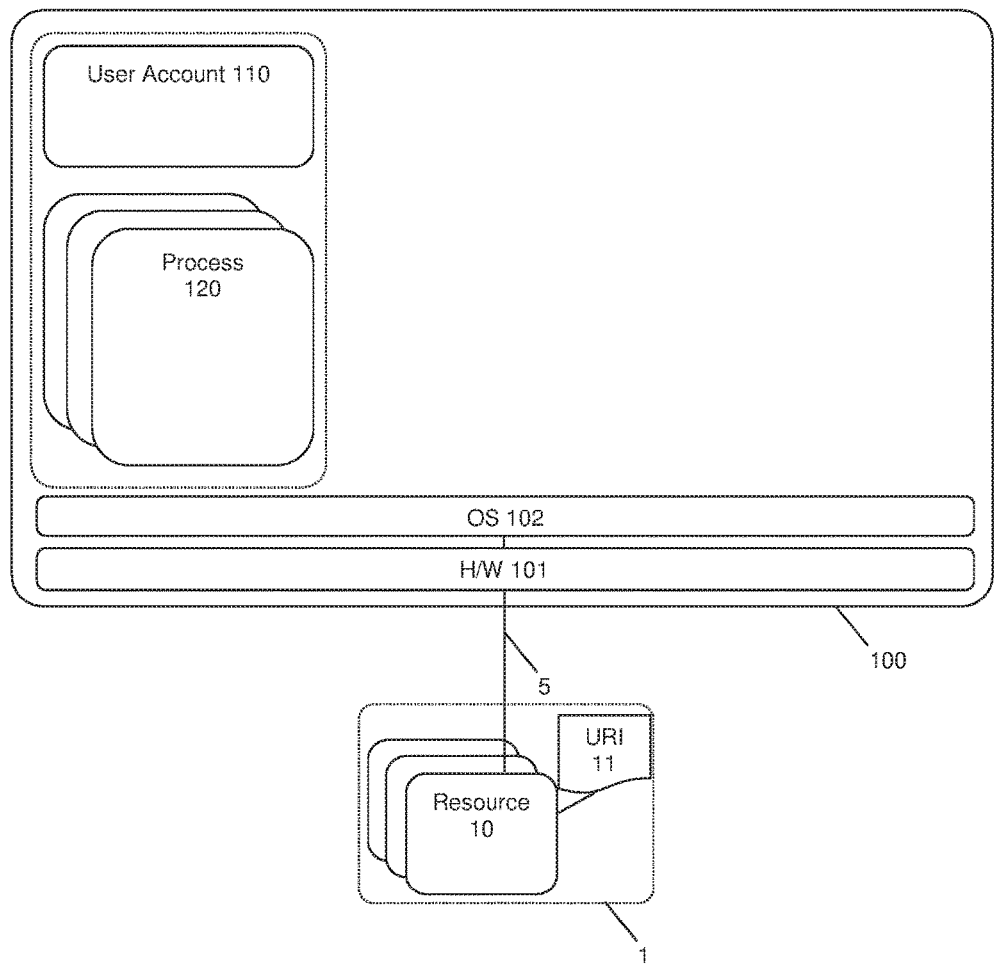
FIG. 2 is a schematic view of an example computer device.

FIG. 2 is a schematic overview of a computer device 100 of a type which may be used in the example embodiments discussed herein. As shown in FIG. 2, the computer device 100 is coupled to a server 1, accessible via the network 5. Particularly, the computer device 100 is configured to access the web resources 10 directly from the server 1 via the network 5.

The server 1 includes and/or provides access to a plurality of web resources 10, identified by URIs 11. The web resources 10 are named, addressable objects, each identified by a respective Uniform Resource Identifiers ('URI'). For example, the web resources 10 may include physical resources, such as web pages or documents identified by HyperText Transfer Protocol (HTTP) URIs or Uniform Resource Locators (URLs), and abstract resources, such as classes, properties or concepts.

Accessing the web resources 10 may be initiated as explicit web requests by the user, such as by typing a URL in an address bar or clicking on a link in a browser. Other web requests for the web resources 10 may be initiated programmatically. For example, a web page requested by the user may be redirected to another URL and/or the web page may aggregate a plurality of potentially unrelated web resources, such as adverts. In addition, the browser may request software updates while browser plug-ins (also known as add-ins, add-ons or extensions) may contact related web services. In practice, most of the web resources 10 may be trusted, but inevitably other untrusted web resources 10 may comprise malicious content. Hence, there is a need to isolate the computer device 100 appropriately from the untrusted web resources while permitting legitimate access to trusted web resources.

Generally, the computer device 100 includes physical hardware (H/W) 101 such as memory, one or more processors (CPUs), one or more I/O interfaces (e.g. network cards, USB interfaces), a power supply and so on. The computer device 100 may take any suitable form factor, such as a server, a static desktop computer or a portable computing device (laptop, tablet, handheld, smart-phone, etc.). In use, the hardware 101 supports an operating system 102 to provide a runtime environment which supports execution of a plurality of user processes or productivity applications 120, according to the needs of the user or users of this particular computer device 100. The runtime environment provides resources such as installed software, system services, drivers, files and/or registry settings.

In this example, the operating system 102 applies a security model wherein access privileges are based on a user account. The operating system 102 may define privilege levels appropriate to different classes of users, or groups of users, and then apply the privileges of the relevant class or group to the particular logged-in user (e.g. ordinary user, super-user, local administrator, system administrator and so on). The user is authenticated such as by logging in to the computer device 100 with a user identity and password, and these user credentials may be validated locally or via a remote service such as a domain controller (e.g. an Active Directory domain controller). The user, via their previously prepared security account, thus acts as a security principal in the security model. The operating system 102 of the computer device 100 then grants appropriate privileges to processes or applications 120 which execute in the user's security context, which is typically considered as a primary user account 110.

The operating system 102 may include a security subsystem (not shown), which is provided to enforce security within the computer device 100. As one example, the security sub-system is provided by the Windows® operating system. The security sub-system, also termed a security module or security manager, suitably enacts the Windows® security model as described, for example, in "Windows Security Overview" published 10 Jun. 2011 by Microsoft® Corporation.

The processes 120 may include web browsers, such as Google Chrome®, Mozilla Firefox® or Microsoft Internet Explorer®, and/or any application or plug-in configurable to request web resources. By default, under the normal behaviour of most conventional operating systems, the processes 120 would or would not be able to access the web resources 10 by authentication and/or authorization provided by the operating system 102, according to the privilege rights of the user, as defined for the primary user account 110.

Figure 3:
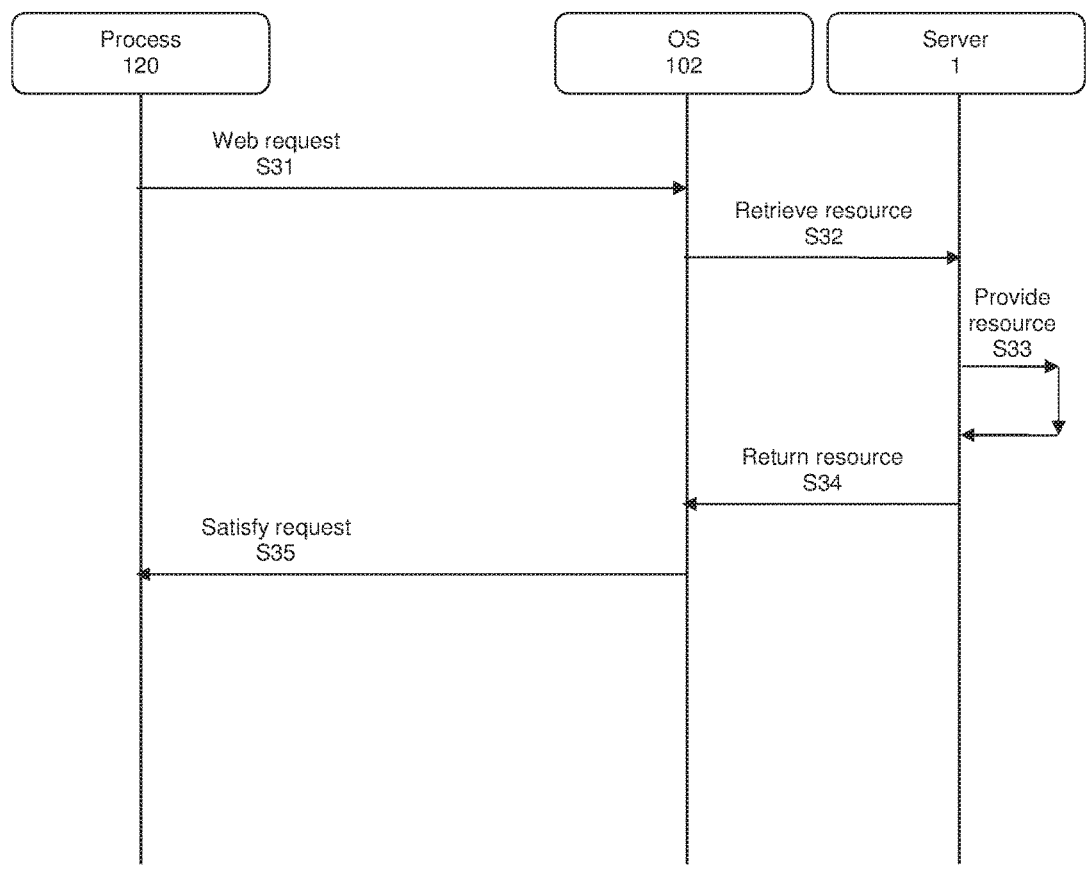
FIG. 3 is a flowchart of an example method of operating the computer device of FIG. 2.

FIG. 3 is a flowchart of an example method of operating the computer device 100, including an example mechanism to access the web resource 10 from the process 120.

At S31, the process 120 sends a web request for the web resource 10 to the operating system 102. The operating system 102 retrieves the web resource 10 at S32 by retrieving the web resource 10 from the server 1 via the network 5.

At S33, the server 1 provides the web resource 10 according to the URI 11 of the web resource 10. For example, the server 1 may obtain the web resource 10 according to the name and/or address identified by the URI 11.

At S34, the web resource 10 is returned from the server 1 via the network 5 to the operating system 102, which in turn satisfies the web request at S35 by returning the web resource 10 to the process 120. When the web resource 10 is not obtainable and/or the web request may not be satisfied positively, the process 120 may be appropriately informed in a failure response at S35.

Figure 4:
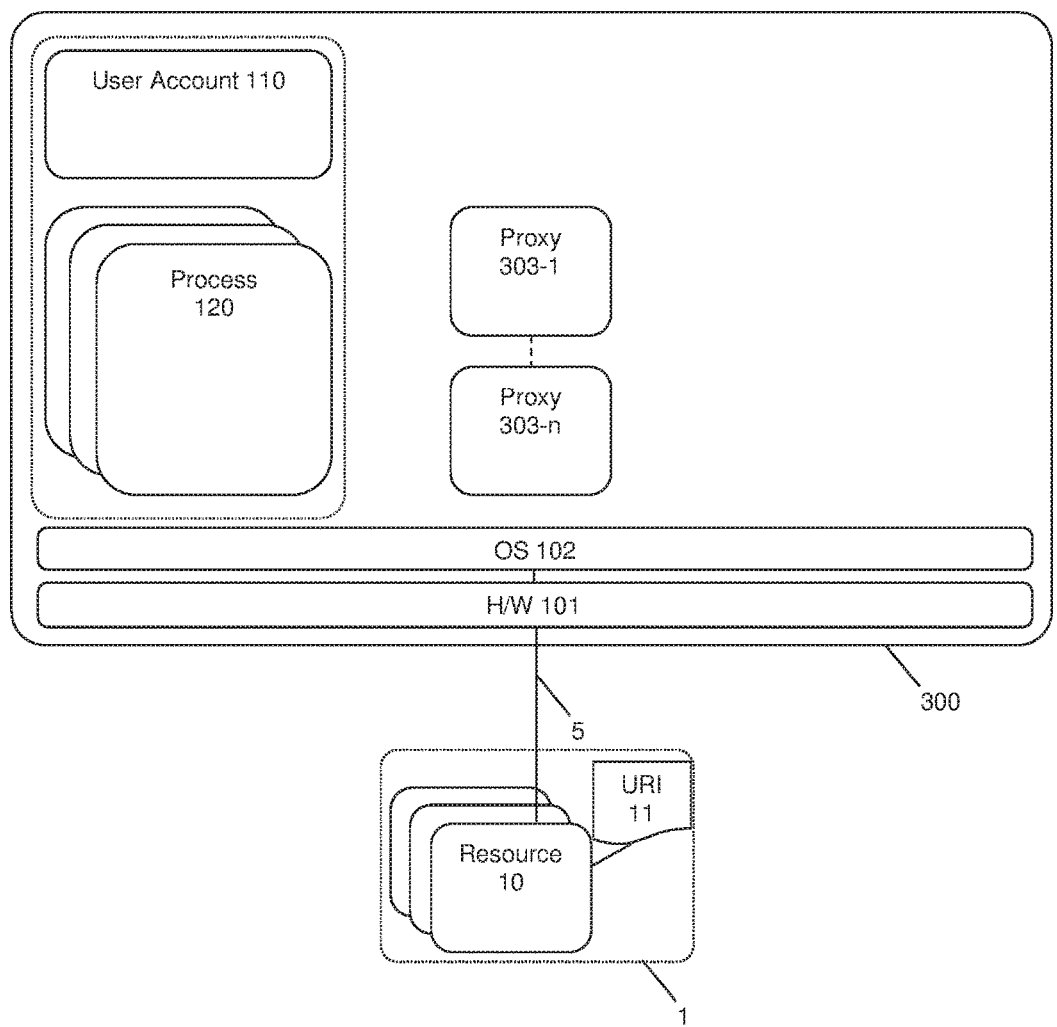
FIG. 4 is a schematic view of another example computer device.

FIG. 4 is a schematic overview of a computer device 300 of a type which may be used in the example embodiments discussed herein. The computer device 300 is generally similar to the computer device 100 described above, and hence extensive description need not be repeated here. In this example, the computer device 300 includes one or more web proxies 303, which in FIG. 4 are illustrated by the web proxies 303-1 to 303-n.

Typically, organizations provide networked access for computer devices to resources through proxy servers. A proxy server is a server that may be implemented in hardware or software, that acts as an intermediary for requests from clients for resources on other servers. For example, the clients may connect to the proxy server and request resources available on other servers. The proxy server may evaluate the requests and subsequently satisfy the requests. In this way, the proxy server provides indirect access to the resources on the other servers. At the same time, this indirect access to the resources typically makes the clients anonymous to the other servers.

Most proxy servers are web proxies, configured to allow access to the resources on the Internet. Typically, a web proxy is registered for certain computer devices in an organization or local domain. Requests for resources from relevant processes or applications, such as browsers, running on those computer devices are sent to the registered web proxy. The web proxy may run in its own separate independent address space. The web proxy may be accessed via a registered port, i.e. a public port. Typically, a computer system may be configured such that a single web proxy will satisfy requests for the web resources from multiple processes or applications running on multiple computer devices. To help mitigate against some of the problems of malicious content, a content filtering web proxy may provide administrative control over relayed web resources, typically to enforce Internet usage policy in the local domain. Such a web proxy may also enforce security by monitoring the relayed web resources for malicious content.

In more detail, the web proxies 303-1 to 303-n of this example are configured to provide access to the web resources 10. Particularly, the web proxies 303-1 to 303-n are registered on or for the computer device 300 and are configured to run in their own separate address spaces on the computer device 300. The web proxies 303-1 to 303-n are configured to receive requests for the web resources 10 from the processes 120 via ports registered for the respective web proxies. In this particular example, the web proxies 303-1 to 303-n are chained. Particularly, the web proxy 303-1 is configured as a first or downstream web proxy and configured to forward requests for the web resources 10 to the web proxy 303-n. In turn, the web proxy 303-n is configured as a second and/or last or upstream web proxy and configured to access the web resources 10 via the network 5.

In FIG. 4, each of the web proxies 303 is represented as residing within the computer device 300. In another example, one or more of the web proxies 303 may be provided externally to the computer device 300. Furthermore, while a plurality of web proxies 303 are shown, only a single web proxy, such as the web proxy 303-1, may be provided in some examples.

Figure 5:
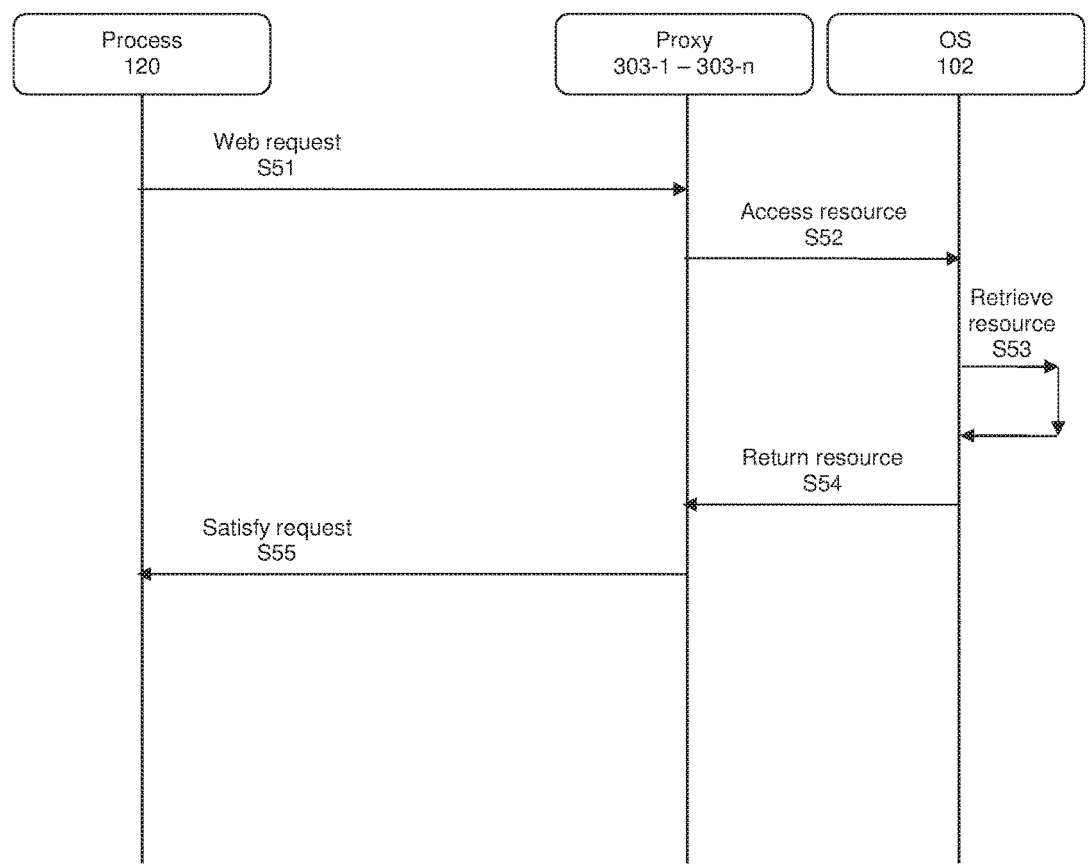
FIG. 5 is a flowchart of an example method of operating the computer device of FIG. 4.

FIG. 5 is a flowchart of an example method of operating the computer device 300, including an example mechanism to access the web resource 10 from the process 120 via one or more of the web proxies 303.

At S51, the process 120 originates a web request for the web resource 10. The web request is directed to the first web proxy 303-1 via a registered port. The web request of step S51 may arise, for example, in response to a user action or in response to a programmatic event. The first web proxy 303-1 handles the web request and/or forwards the web request to a next element in the proxy chain. In this example, the web request is forwarded to the last web proxy 303-n, according to known mechanisms.

At S52, the last web proxy 303-n accesses the web resource 10 by requesting the operating system 102 to retrieve the web resource 10. The operating system 102 retrieves the web resource 10 at S53, as described previously, and returns the web resource 10 to the last web proxy 303-n at S54. The web resource 10 is returned up the web proxy chain from the last web proxy 303-n to the first web proxy 303-1. At S55, the first web proxy 303-1 satisfies the web request by returning the web resource 10 to the process 120.

Figure 6:
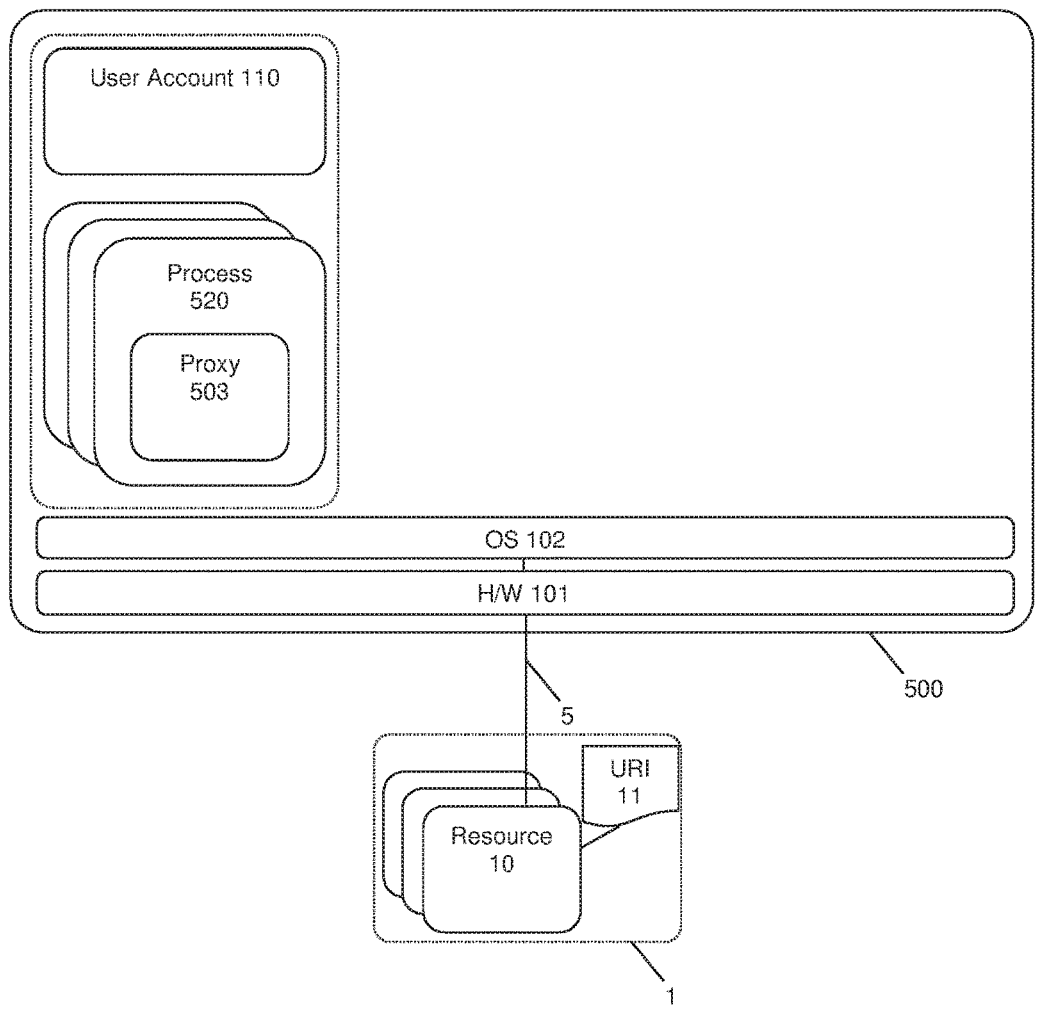
FIG. 6 is a schematic view of yet another example computer device.

FIG. 6 is a schematic view of a computer device 500, similar to the computer device 100. In this example, the computer device 500 is further adapted in order to better control access to the web resource 10. Particularly, the computer device 500 is adapted to allow intra-process access control to the web resources 10 to be implemented. In this way, desired, legitimate, web requests from the processes 520 may be appropriately satisfied while the computer device 500 is better protected from accidental tampering or malicious attacks due to untrusted resources amongst the web resources 10.

In this embodiment, the computer device 500 similarly includes processes 520, which execute in the user's security context in the primary user account 110.

In contrast to the processes 120 described above, a process 520 further includes a web proxy 503, which is configured to receive web requests from and to run in an address space of the process 520. That is, the web proxy 503 is configured to run within or intra the process 520 i.e. the process 520 hosts the proxy 503. That the web proxy 503 is configured to run in the address space of the process 520 is in further contrast to the web proxies 303-1-303-n described above, which are configured to run in their own separate, independent address spaces, either on the computer device 500 or on another computer device, external to the computer device 500.

In detail, the web proxy 503 is configured to control access to the web resources 10 by superseding access control provided by default by the operating system 102. Particularly, the web proxy 503 is configured to examine web requests received by the web proxy 503. In this way, the web proxy 503 may selectively permit or deny web requests from the process 520, thereby selectively and securely controlling access to the web resource 10 from the process 520, so as to ensure that only web requests that belong to the primary user account 110 are allowed to pass through while other web requests are denied. In this way, legitimate web requests may be satisfied, without compromising security of the computer device 500.

The web proxy 503 may be configured to run in the address space of the process 520 by being configured to be injected into the address space of the process 520, for example, during loading/launching of the process 520 i.e. the web proxy 503 may be loaded dynamically into the process 520. The web proxy 503 may be implemented as a Dynamic Link Library (DLL) that may be provided in the allocated address space of the process 520, for example, by loading the DLL into the allocated address space of the process 520. For example, a web proxy 503 may be injected into every launching process 520 i.e. the web proxy 503 may be omnipresent. The web proxy 503 may be configured to hook relevant application programming interfaces (APIs) and/or virtualize settings (e.g. file and/or registry settings, web proxy settings), as conventionally employed for and/or by web proxies. The web proxy 503 may be configured to present itself to (i.e. register with, privately register with) the process 520. Furthermore, the web proxy 503 may be configured to present itself to the process 520 always as a first web proxy in any proxy chain. In this way, the web proxy 503 is in a prime position to receive or intercept a web request first, e.g. before the web request is sent out of the process 520. The web proxy 503 may relay and hence monitor and/or control all web requests and/or all requested web resources 10. Since the web proxy 503 may receive a web request first, a speed of response and/or handling the web request may be increased. Alternatively, the web proxy 503 may remain dormant and allow web requests and requested web resources 10 to be relayed transparently, i.e. pass through.

Since the web proxy 503 is configured to run in the address space of the process 520, the web proxy 503 may be configured to access the operating system 102 directly, in contrast to, for example, plug-ins which may not access the operating system 102 directly. In this way, the web proxy 503 may access functionality provided by the operating system 102, including independently of the process 520.

Since the web proxy 503 is configured to run in the address space of the process 520, the web proxy 503 is unique (i.e. specific) to the process 520. That is, there is a one-to-one relationship between the web proxy 503 and the process 520. In other words, each web proxy 503 is associated with exactly (i.e. only) one respective process 520. Conversely, each process 520 is associated with exactly (i.e. only) one respective in-process web proxy 503. In this way, the web proxy 503 may control access to the web resources 10 specifically for the process 520.

As a default behaviour of most operating systems, the operating systems may not provide a mechanism whereby each process of application is associated with a different web proxy. In contrast to this default behaviour, a different running instance of the web proxy 503 may run in each different running instance of the processes 520. For example, the computer 500 may contain a plurality of process 520 and a plurality of in-process web proxies 503, wherein each in-process web proxy runs in one respective process. In this example, one web proxy 503 may be provided per instance of the process 520.

Furthermore, since the web proxy 503 is configured to run in the address space of the process 520, this in-process web proxy 503 may be configured to determine a connection origin of a web request received by the web proxy 503, i.e. from the process 520. In this way, the web request may not be anonymous and thus the web proxy 503 may determine a legitimacy of the web request, i.e. that the web request originates from the process 520 rather than, for example, from malicious code.

Additionally, since the web proxy 503 is configured to run in the address space of the process 520, the web proxy 503 is configured to be visible to the process 520 and is configured to be not visible to another process 520, i.e. the web proxy 503 is invisible to all processes 520 except for the process 520 in which the web proxy 503 runs. In this way, the web proxy 503 ensures that other processes 520 are not affected by the proxy 503. Particularly, in contrast to conventional web proxies, such as web proxies 303-1-303-n described above, the web proxy 503 may not be registered on the computer device 500.

In addition, since the web proxy 503 is configured to run in the address space of the process 520, the web proxy 503 may be configured exclusively for the process 520. For example, a port for communication between the web proxy 503 and the process 520 may be privately defined (i.e. not registered) and may be exclusive (e.g. by randomizing the defined port and/or by dynamically defining the port). In this way, external access to the web proxy 503 via this port may be restricted, thereby minimizing a potential for illegitimate web requests from malicious code.

In addition, since the web proxy 503 is configured to run in the address space of the process 520, there may be no requirement to modify a firewall, for example, configured for the computer device 500.

Figure 7:
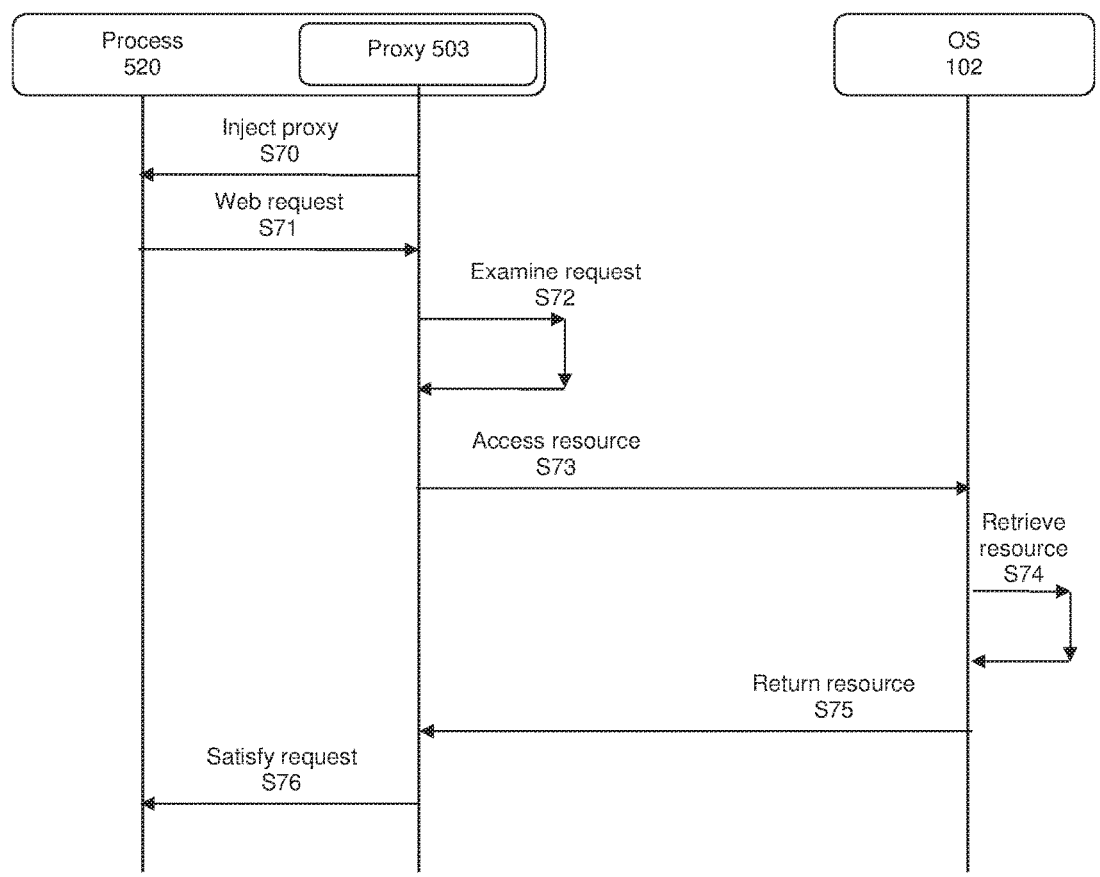
FIG. 7 is a flowchart of an example method of operating the computer device of FIG. 6.

FIG. 7 is a flowchart of an example method of operating the computer device 500, including an example mechanism to better control access the web resource 10 from the process 520, according to the in-process web proxy 503.

At S70, the in-process web proxy 503 is injected into the address space of the process 520, for example, during loading/launching of the process 520. The in-process web proxy 503 may hook relevant APIs and/or virtualize settings, e.g. web proxy settings stored by and/or accessible to the operating system 102. The in-process web proxy 503 may present itself to the process 520, for example, as a first web proxy in a proxy chain, as described above. A port for communication between the in-process web proxy 503 and the process 520 may be privately and/or exclusively defined, i.e. a private port.

At S71, the process 520 sends, via the private port, a web request for the web resource 10, which is received by the in-process web proxy 503. At S72, the in-process web proxy 503 examines the web request and selectively permits or denies the web request. For example, the in-process web proxy 503 may examine a connection origin of the web request and/or the URI 11 of the web resource 10. For example, the web proxy 503 may permit or deny the web request according to the connection origin and/or the URI 11. For example, if the connection origin is not the process 520, the web proxy 503 may deny the web request while if the connection origin is the process 520, the web proxy 503 may permit the web request. For example, if the URI 11 relates to untrusted content, the web proxy 503 may deny the web request while if the URI 11 relates to trusted content, the web proxy 503 may permit the web request.

If the web proxy 503 permits the web request, the web proxy 503 accesses the web resource 10 at S73 by forwarding the web request for the web resource 10 toward the operating system 102. The operating system 102 retrieves the web resource 10 at S74, as described above, and returns the web resource to the web proxy 503 at S75. At S76, the web proxy 503 in turn satisfies the web request by returning the web resource 10 to the process 520.

Conversely, if the web proxy 503 denies the web request, the web proxy 503 may, for example, return a denied message to the process 520. In this way, illegitimate web requests and/or web requests relating to untrusted content may be blocked.

In some examples, the web proxy 503 may be inserted into a process but then is selectively configured to remain dormant and allow web requests and requested web resources 10 to be relayed transparently, i.e. pass through without interference.

Hence, according to this example mechanism, access from a process to web resources may be controlled by a web proxy configured to run in an address space of the process. In this way, the computer device 700 is better protected from malicious content.

Figure 8:
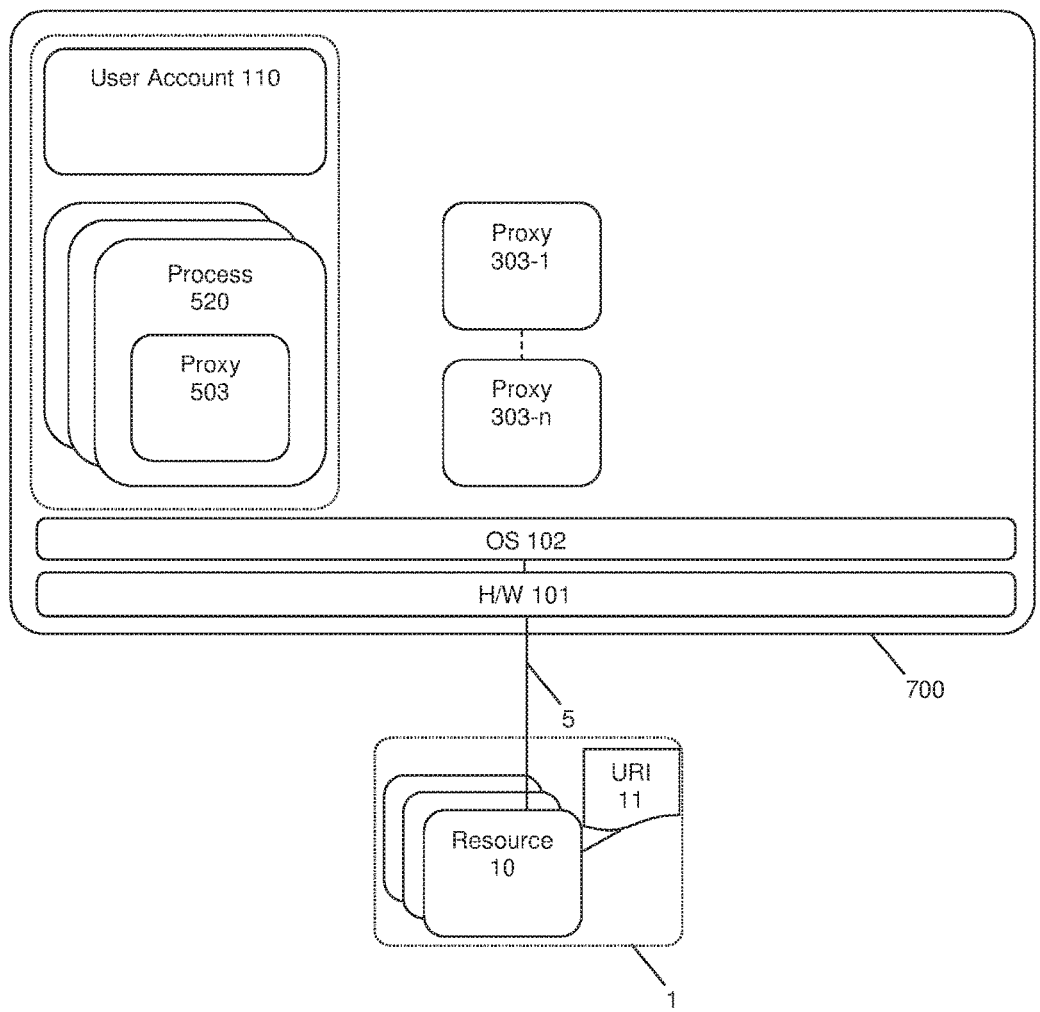
FIG. 8 is a schematic view of still yet another example computer device.

FIG. 8 is a schematic view of a computer device 700, similar to the computer device 300. In this example, the computer device 700 is further adapted in order to better control access to the web resource 10. Particularly, the computer device 700 is adapted to allow intra-process access control to the web resources 10 to be implemented. In this way, desired, legitimate, web requests from the processes 520 may be appropriately satisfied while the computer device 700 is better protected from accidental tampering or malicious attacks due to untrusted resources amongst the web resources 10.

In detail, the in-process web proxy 503 is configured to control access to the web resources 10 by superseding access provided by default by the web proxies 303-1-303-n. In this way, the in-process web proxy 503 may selectively permit or deny web requests from the process 520, thereby selectively and securely controlling access to the web resource 10 from the process 520, so as to ensure that only web requests that belong to the primary user account 110 are allowed to pass through while other web requests are denied. In this way, legitimate web requests may be satisfied, without compromising security of the computer device 700.

As described previously, the process 520 further includes the web proxy 503, which is configured to receive web requests and to run in the address space of the process 520. Also as described previously, the web proxy 503 may present itself to the process 520 as the first web proxy.

In addition, in this embodiment, the web proxy 503 is configured to chain with the web proxies 303-1-303-n. Specifically, the web proxy 503 may be configured to chain with the first web proxy 303-1. However, since the web proxy 503 may configured to be invisible to all other processes 520, including the web proxies 303-1-303-n, the web proxy 303-1 may continue to be registered as the first web proxy while the web proxy 303-n may continue to be configured as the second and/or last web proxy. That is, the web proxy 503 may be configured to behave as a virtual first web proxy, whereby the web proxy 503 may receive web requests first from the process 520 and subsequently, relay the web requests to the first web proxy 303-1. In this way, the web proxy 503 may be configured to control access to the web resources 10 without interfering with web proxy chaining and/or positions of web proxies in a web proxy chain (e.g. of the web proxies 303-1-303-n).

Figure 9:
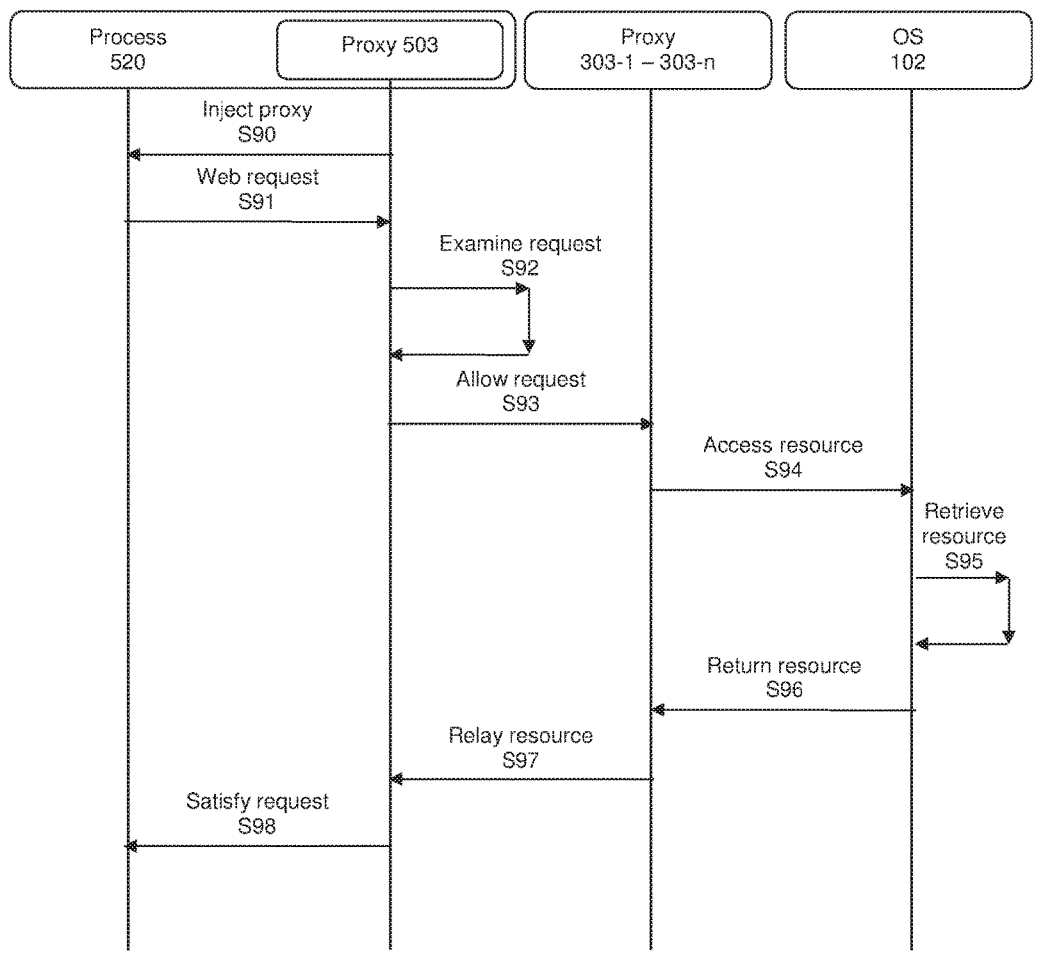
FIG. 9 is a flowchart of an example method of operating the computer device of FIG. 8.

FIG. 9 is a flowchart of an example method of operating the computer device 700, including an example mechanism to better control access the web resource 10 from the process 520, according to the in-process web proxy 503.

At S90, the web proxy 503 is injected into the address space of the process 520, as described above. Particularly, the web proxy 503 may present itself to the process 520, for example, as the virtual first web proxy, as described above, for communication over the private port. In addition, the web proxy 503 may chain to the first web proxy 303-1.

At S91, the process 520 sends, via the private port, a web request for the web resource 10, which is received by the web proxy 503. At S92, the web proxy 503 examines the web request and selectively permits or denies the web request, as described above.

If the web proxy 503 permits the web request, the web proxy 503 allows the web request and relays the web request for the web resource 10 to the first web proxy 303-1 at S93. The first web proxy 303-1 handles and/or forwards the web request, for example, to the chained last web proxy 303-n, according to known mechanisms. In turn, the last web proxy 303-n accesses the web resource 10 from the operating system at S94. As described previously, the operating system 102 retrieves the web resource 10 at S95 and returns the web resource to the web proxies 303-1-303-n at S96. The web resource 10 is returned up the web proxy chain from the last web proxy 303-n to the first web proxy 303-1. The web resource 10 is hence relayed to the web proxy 503 at S97 and hence to the process 520, thereby satisfying the web request by returning the web resource 10 to the process 520 at S98, as described previously.

Conversely, if the web proxy 503 denies the web request, the web proxy 503 may, for example, return a denied message to the process 520, as described previously.

Hence, according to this example mechanism, access from a process to web resources may be controlled by a web proxy configured to run in an address space of the process and configured as chain transparently with a proxy chain. In this way, the computer device 700 is better protected from malicious content.

Figure 10:
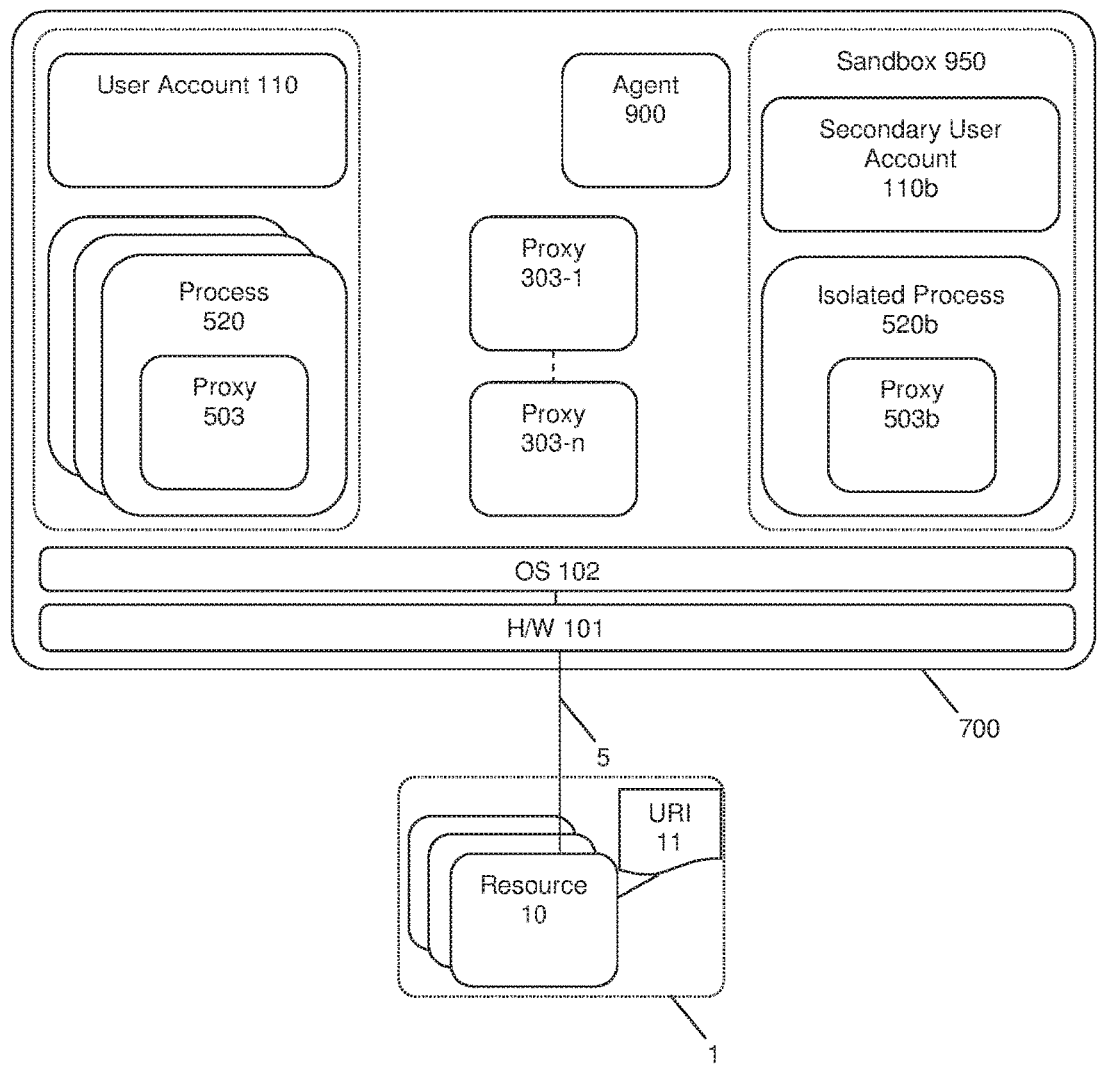
FIG. 10 is a schematic view of the computer device of FIG. 8, in more detail.

FIG. 10 is a schematic view of the computer device 700, in more detail. Particularly, a sandbox 950 is provided to protect the computer device 700 from malicious attacks by isolating untrusted processes and/or untrusted content. The sandbox 950 may also be termed a 'content isolation environment' and is suitably created and controlled by an agent 900, as will be explained in more detail below. It will be appreciated by the person skilled in the art that the agent 900 and/or sandbox 950 may be similarly provided for the computer device 300 and thus, to avoid repetition, such a configuration shall not be additionally described.

Typically, user interactions may cause the computer device 700 to perform tasks, at least some of which may be defined in advance as being 'untrusted' tasks. For example, untrusted tasks may include certain forms of Web browsing, viewing email attachments, starting an untrusted application program, or accessing a particular file in a storage medium. Generally, the untrusted tasks may involve non-executable content (data) and/or may include executable content (code) which, at least initially, is not trusted. That is, the untrusted tasks may be in relation to untrusted content (e.g. files) or untrusted content may be accessible on the computer device 700. Hence, the agent 900 is configured to provide the sandbox 950 which is used to isolate these untrusted tasks and/or this untrusted content, so that these tasks and/or content are inhibited from interfering with other tasks or components of the computer device 700. Isolation is advantageous to inhibit interference, whether caused intentionally or unintentionally. Notably, 'untrusted' does not mean that the respective task or content is necessarily malicious. Instead, the untrusted task or content simply has the possibility of introducing undesired effects and, at least initially, it is desired to isolate the untrusted task or content away from most of the other resources or components of the computer device 700.

In this example, the sandbox 950 has been used to isolate one or more processes 520b. The agent 900 is arranged to provision the sandbox 950 by programmatically creating a secondary primary user account 110b. The agent 900 may be configured to automatically create a new secondary primary user account 110b with rights and privileges which are derived from those of the primary user account 110 of the logged-in user. Typically, a secondary user identity and password are created programmatically and associated with the secondary primary user account 110b. Thus, the primary user account 110 and the secondary primary user account 110b are related but do not share the same user credentials.

The primary user account 110 is based on the user as the security principal and an access token of the primary user account 110 is set accordingly. Meanwhile, the secondary primary user account 110b is derived from the primary user account 110 and will have a subset of the privileges of the primary user account 110. In this example, the security context of the secondary primary user account 110b is deliberately restricted to a minimal set of access rights as its privilege level.

The agent 900 may be configured to classify web resources according to sandbox categories (e.g. do not sandbox, trusted or untrusted). The agent 900 may be configured to provision a new sandbox if the web resource relates to a different sandbox category.

Similar to the process 520 described above, the isolated process 520b in the sandbox 950 further includes a web proxy 503b, which is configured to receive web requests from and to run in an address space of the isolated process 520b. In addition, the web proxy 503b may be configured to permit web requests originating from the sandbox 950 and to deny web requests not originating from the sandbox 950. Particularly, the web proxy 503b may be configured to deny web requests not originating from the sandbox 950. For example, the web proxy 503b may be configured to deny web requests from the process 520 in the user account 110. Further, the web proxy 503b may be configured to deny web requests not originating from the isolated process 520b. For example, the web proxy 503b may be configured to deny web requests from another isolated process (i.e. not the isolated process 520b) in the sandbox 950. Specifically, the web proxy 503b may be configured to permit web requests from the isolated process 520b in the sandbox 950. For example, the web proxy 503b may be configured to only permit web requests from the isolated process 520b in the sandbox 950. In this way, the computer 700 may be better protected from vectors of attack related to the web resources 10.

In addition, the web proxy 503b may be configured to present itself, for example as the first web proxy, to isolated processes in the sandbox 950, such as the isolated process 520b. Conversely, the web proxy 503 may be configured to not present itself to the process 520 in the primary user account 110 and hence remain dormant. That is, the web proxies 503 & 503b may be configured such that their dormancy (conversely, activity) is according to the user account.

The agent 900 may be further configured to perform checks relating to web requests. For example, the agent 900 may be configured to receive web requests from the web proxy 503 and may examine a connection origin of the web request and/or the URI 11 of the web resource 10. Further, the agent 900 may be configured to permit or deny the web requests according to the connection origin and/or the URI 11 and/or the security context of the secondary primary user account 110b.

Figure 11A:
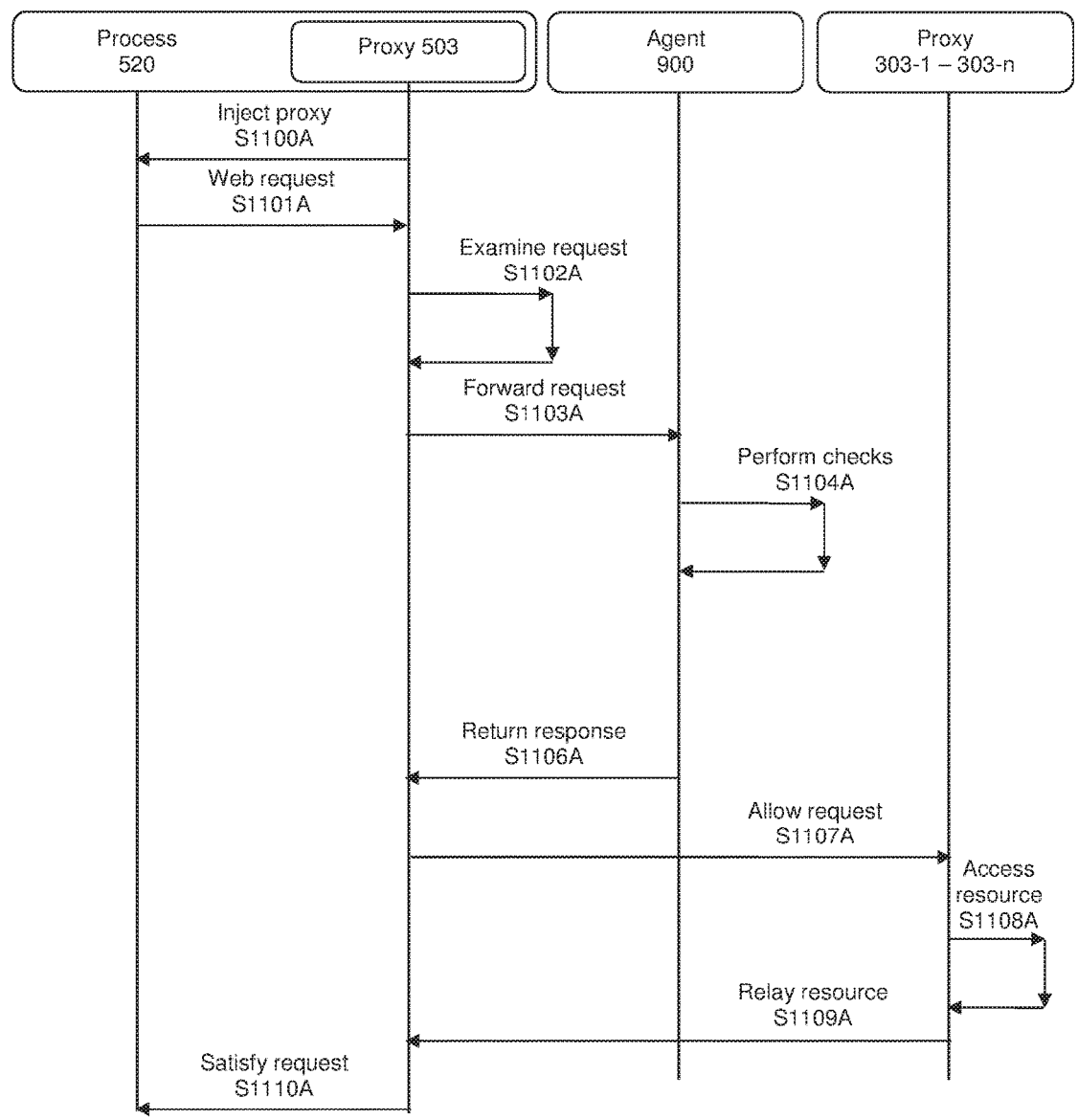
FIGS. 11A, 11B & 11C are flowcharts of example methods of operating the computer device of FIG. 10.

FIG. 11A is a flowchart of an example method of operating the computer device 700, including an example mechanism to better control access the web resource 10 from the process 520, according to the web proxy 503. Particularly, this example mechanism relates to the agent 900 permitting the web request according to the security context of the primary user account 110.

At S1100A, the web proxy 503 is injected into the address space of the process 520, as described above, for example, in relation to S90.

At S1101A, the process 520 sends, via the private port, a web request for the web resource 10, which is received by the web proxy 503. At S1102A, the web proxy 503 examines the web request and forwards the request to the agent 900 at S1103A.

At S1104A, the agent 900 performs checks relating to the web request according to the connection origin and/or the URI 11 and/or the security context of the primary user account 110. According to a result of the checks, the agent 900 selectively permits or denies the web request. If the agent 900 permits the web request according to the security context of the primary user account 110, for example, the agent 900 returns a corresponding response to the proxy 503b at S1106A.

If the returned response permits the web request, the web proxy 503b allows the web request and relays the web request for the web resource 10 to the first web proxy 303-1 at S1107A. As similarly described previously, the web resource 10 is accessed at S1108A, relayed to the web proxy 503 at S1109A and the web request satisfied at S1110A.

Hence, according to this example mechanism, web resources, which may relate to trusted content as checked by an agent, may be accessed. In this way, the computer device 700 is better protected from malicious content.

Figure 11B:
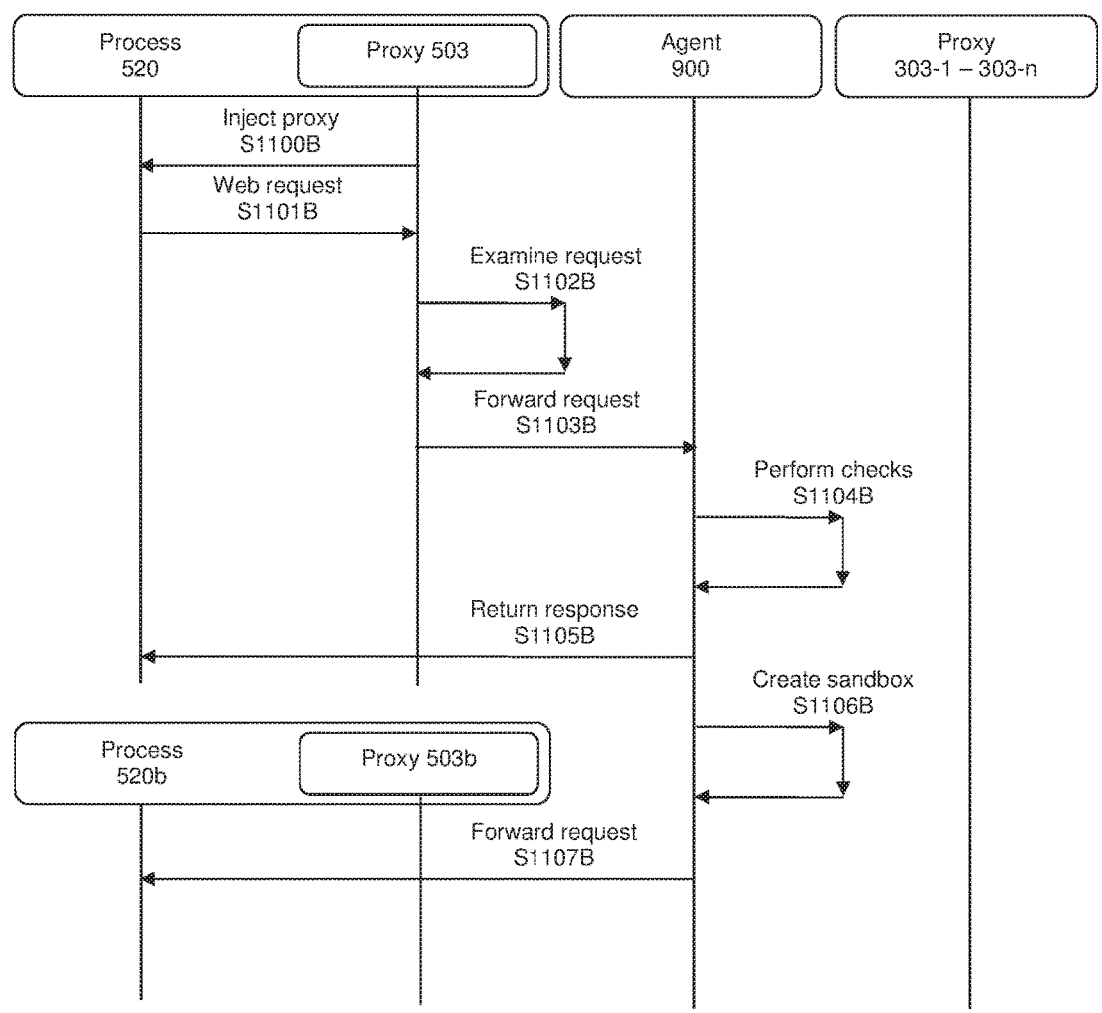

FIG. 11B is a flowchart of an example method of operating the computer device 700, including an example mechanism to better control access the web resource 10 from the process 520, according to the web proxy 503. Particularly, this example mechanism relates to the agent 900 denying the web request according to the security context of the primary user account 110 but permitting the web request according to the security context of the secondary primary user account 110b.

At S1100B, the web proxy 503 is injected into the address space of the process 520, as described above, for example, in relation to S1100A.

At S1101B, the process 520 sends, via the private port, a web request for the web resource 10, which is received by the web proxy 503. At S1102B, the web proxy 503 examines the web request and forwards the request to the agent 900 at S1103B.

At S1104B, the agent 900 performs checks relating to the web request according to the connection origin and/or the URI 11 and/or the security context of the primary user account 110. According to a result of the checks, the agent 900 selectively permits or denies the web request. If the agent 900 denies the web request according to the security context of the primary user account 110 e.g. the web request relates to untrusted content, the agent 900 may instead permit the web request to be satisfied within a sandbox. Alternatively, if the agent 900 denies the web request according to the connection origin (i.e. the web request does not originate from the primary user account 110), the agent 900 may block the web request or the agent 900 may instead permit the web request to be satisfied within a sandbox. The agent 900 informs the process 520 appropriately of the blocked web request and/or of the sandbox requirements at S1105B, such that a message, for example, may be subsequently presented to the user by the process 520. Hence, at S1106B, the agent 900 creates the sandbox 950, which may thus isolate the untrusted content. The agent 900 forwards the web request for the web resource 10 to the newly-created isolated process 520b in the newly-created sandbox 950 at S1107B.

As described below with reference to FIG. 11C, the web request for the web resource 10 may be satisfied by the web proxy 503b for the isolated process 520b in the sandbox 950.

Hence, according to this example mechanism, web resources, which may relate to untrusted content, may be isolated in a sandbox, which may be created dynamically. In this way, the computer device 700 is better protected from malicious content.

Figure 11C:
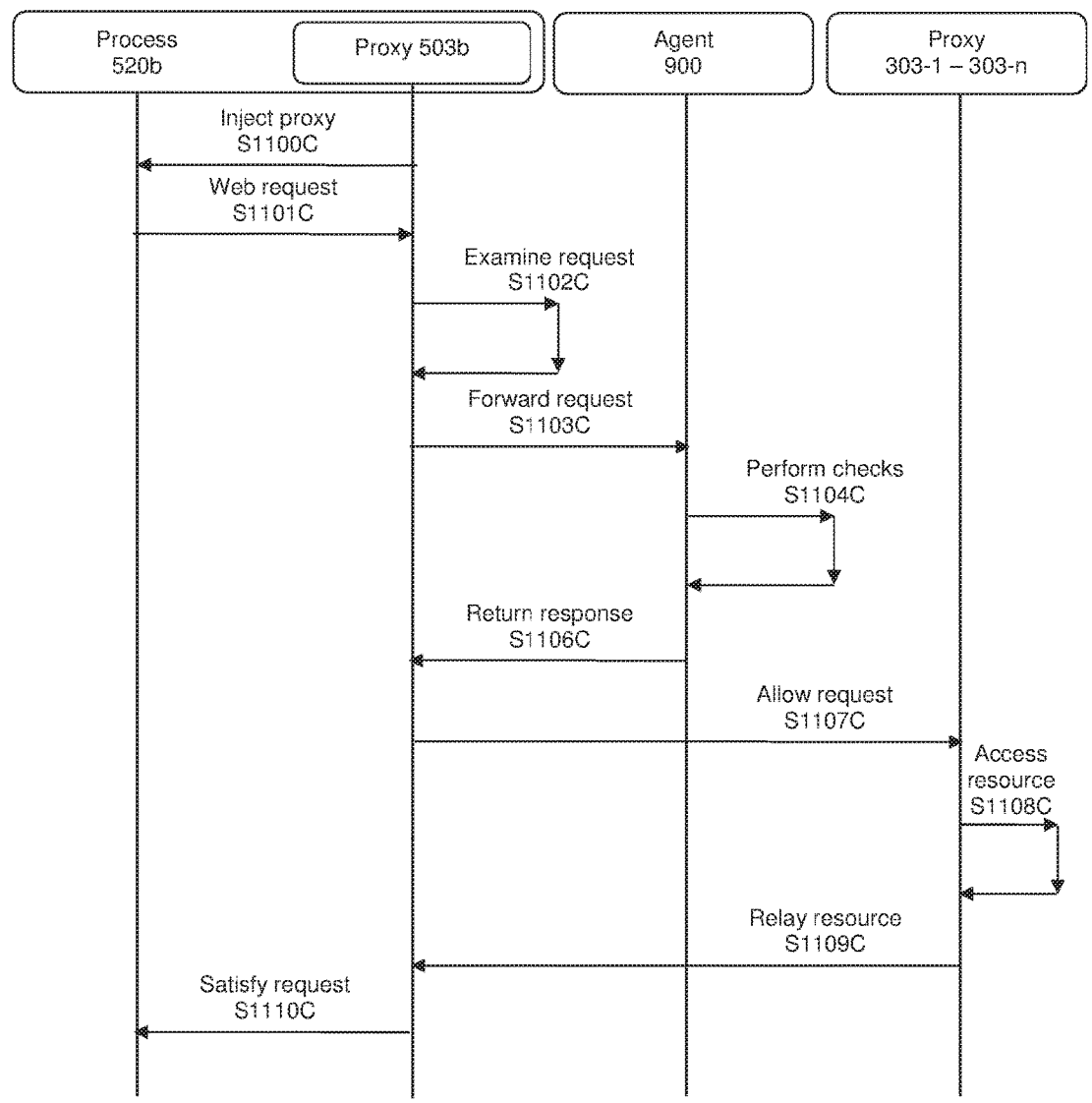

FIG. 11C is a flowchart of an example method of operating the computer device 700, including an example mechanism to better control access the web resource 10 from the process 520b in the sandbox 950, according to the web proxy 503b. Particularly, this example mechanism relates to the agent 900 permitting the web request according to the security context of the secondary primary user account 110b and/or denying the web request according to the connection origin of the web request.

At S1100C, the web proxy 503b is injected into the address space of the process 520b, as described above, for example, in relation to S1100A.

At S1101C, the process 520b sends, via the private port, a web request for the web resource 10, which is received by the web proxy 503b. The web request for the web resource 10 may originate, for example, from a user or programmatically or may be forwarded by the agent 900, as described previously with reference to FIG. 11B. At S1102C, the web proxy 503b examines the web request and forwards the request to the agent 900 at S1103C.

At S1104C, the agent 900 performs checks relating to the web request according to the connection origin and/or the URI 11 and/or the security context of the secondary primary user account 110b. According to a result of the checks, the agent 900 selectively permits or denies the web request. If the agent 900 denies the web request according to the security context of the secondary primary user account 110b, the agent 900 may instead permit the web request to be satisfied within a new sandbox, which the agent 900 may create as described previously. Alternatively, if the agent 900 denies the web request according to the connection origin (i.e. the web request does not originate from the secondary primary user account 110b), the agent 900 may block the web request. Hence, the agent returns a response to the proxy 503*b*, running in the isolated process 520*b* in the sandbox 950, at S1106C.

If the returned response permits the web request, the web proxy 503*b* allows the web request and relays the web request for the web resource 10 to the first web proxy 303-1 at S1107C. As similarly described previously, the web resource 10 is accessed at S1108C, relayed to the web proxy 503 at S1109C and the web request satisfied at S1110C.

Hence, according to this example mechanism, web requests for web resources originating from sandboxed user accounts may be satisfied within the sandboxes while web requests originating outside of the sandboxed user accounts may be denied. In this way, the computer device 700 is better protected from malicious content.

Figure 12:
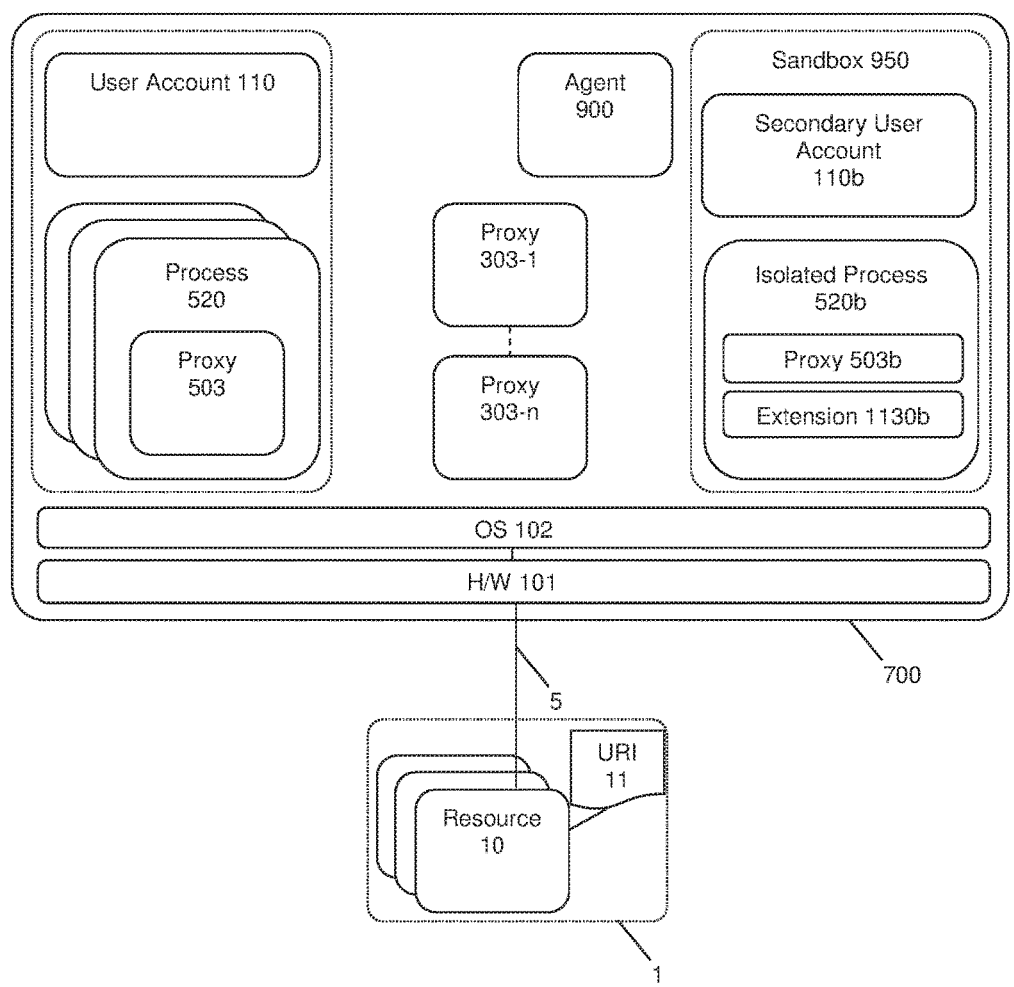
FIG. 12 is a schematic view of the computer device of FIG. 10, in more detail.

FIG. 12 is a schematic view of the computer device 700, in more detail. Particularly, an extension 1130*b* may be provided for the process 520*b*, which may provide context information, related to web requests, to the web proxy 503*b*. In this way, the web proxy 503*b* may better differentiate or distinguish between web requests initiated by the user and web requests initiated programmatically, thereby enhancing user experience while maintaining a security of the computer device 700. It will be appreciated by the person skilled in the art that the extension 1130 may be similarly provided for the process 520 and thus, to avoid repetition, such a configuration shall not be additionally described. Furthermore, it will be appreciated by the person skilled in the art that the extension 1130 may be similarly provided for the computer device 300 and thus, to avoid repetition, such a configuration shall not be additionally described.

Typically, web requests may result in redirection and/or aggregation of other web resources. For example, while the user might wish to access a particular website according to a domain, content of that website might be retrieved from a different domain (i.e. redirection). For example, a web request for onedrive.com may be redirected to onedrive.live.com while a web request for onedrive.live.com may be in turn redirected to login.live.com. Furthermore, a part of the content may be retrieved from one or more different domains (i.e. aggregation). For example, content for onedrive.com may be aggregated from:

https://skypewebexperience.live.com/
https://az598575.vo.msecnd.net/
https://go.trouter.io/
https://az598575.vo.msecnd.net/
https://pipe.skype.com/
https://people.directory.live.com/
https://geo.gateway.messenger.live.com/
https://a.gfx.ms/
https://spoprod-a.akamaihd.net/

Hence, context information related to the web request may be used to determine, for example, whether the web request was initiated by the user, whether the web request was initiated programmatically and/or whether the web request relates a redirected web request and/or an aggregated web request. This context information may be used to determine what checks, if any, should be performed for the web request, for example, by the agent 900, so as to maximise a user experience while maintaining a security of the computer device 700.

According to a default behaviour of most processes 520 such as browsers, context information related to web requests is not accessible by the proxy 503, configured to run in an address space of the process 520. Hence, the extension 1130*b* may be provided for the process 520*b*, which may provide context information, related to web requests, to the web proxy 503*b*.

In detail, the extension 1130*b* (e.g. a browser plug-in, add-in, add-on or extension) may be configured to provide additional and/or alternative behaviour for the process 520*b* and may be configured to be loaded by the process 520*b* during loading/launching of the process 520*b*. Typically, extensions such as the extension 1130*b* for processes such as process 520*b* may be configured to have limited or restricted functionality such that, for example, the extension 1130*b* may not access functionality of the operating system 102 or other processes, such as the agent 900. Rather, the extension 1130*b* may be configured to have limited or restricted to functionality provided by or for the process 520*b*, for example. In this way, operation of the process 520*b* may not be compromised by the extension 1130*b*, for example.

The extension 1130*b* may be configured to receive messages transmitted from the process 520*b*. Typically, however, processes such as process 520*b* may be configured to transmit such messages asynchronously to extensions such as the extension 1130*b*. That is, the process 520*b* may not wait for any response to a message received by the extension 1130*b* transmitted from the process 520*b*. In this way, a performance of the process 520 may not be determined by a performance of the extension 1130*b*. Conversely, the extension 1130*b* may not be configured to provide additional and/or alternative behaviour for the process 520*b* that is dependent on the process waiting for any response from the extension 1130*b*. However, the extension 1130*b* may be configured to collect context information related to web requests. Further, the extension 1130*b* may be configured to collect context information related to a web request, in response to a message received from the process 520*b* notifying of the web request, The extension 1130*b* and the web proxy 503*b* may be configured to cooperate. Particularly, the web proxy 503*b* may be configured to access the operating system 102 directly, while the extension 1130*b* may be configured to not access the operating system 102 directly. In contrast, while the extension 1130*b* may be configured to collect context information related to the web request, the web proxy 503*b* may be configured to not collect such context information, since the web proxy 503*b* may not have access to such context information. Hence, the web proxy 503*b* and/or the extension 1130*b* may be configured to implement functionality on behalf of each other i.e. the web proxy 503*b* may be configured to provide services for the extension 1130*b* and/or the extension 1130*b* may be configured to provide services for the web proxy 503*b*.

For example, the extension 1130*b* may be configured to send the collected context information to the web proxy 503*b*. The collected context information may be sent directly to the web proxy 503*b*. Alternatively, the collected context information may be sent to the process 520*b* for onward sending to the web proxy 503*b* i.e. according to conventional routes. The extension 1130*b* may be configured to encode the collected context information to be sent e.g. by wrapping the collected context information as a conventional or regular URL, such that the modified, collected context information may be sent according to functionality available to the extension 1130*b*. The web proxy 503*b* may be configured to receive such context information from the extension 1130*b*. The web proxy 503*b* may be configured to decode modified context information, encoded by and received from the extension 1130*b*. Further, the web proxy 503*b* may be configured to defer accessing the web resource 10 until the context information is received. Further, since the web proxy 503b is configured to run in the address space of the process 520b, the web proxy 503b may be configured to communicate synchronously, rather than asynchronously, with the process 520b such that the process 520b waits for a response from the web proxy 503b before continuing. The web proxy 503b and/or the agent 900 may be configured to examine web requests according to the context information and permit or deny the web requests accordingly. For example, the web proxy 503b and/or the agent 900 may be configured sandbox (e.g. by default, selectively) web requests initiated by the user. For example, the web proxy 503b and/or the agent 900 may be configured permit (e.g. by default, selectively) web requests initiated programmatically from trusted processes. Conversely, the web proxy 503b and/or the agent 900 may be configured deny (e.g. by default, selectively) web requests initiated programmatically from untrusted processes. For example, the web proxy 503b and/or the agent 900 may be configured permit (e.g. by default, selectively) web requests relating to redirected and/or aggregated web requests.

While the extension 1130b may be configured to be loaded by the process 520b during loading/launching of the process 520b, there is a potential for the extension 1130b to be unloaded (e.g. by the user, by an unauthorized user, by another process) such that the extension 1130b may be compromised whereby, for example, web requests relating to malicious content may incorrectly permitted. Hence, the extension 1130b and the web proxy 503b may be configured to cooperate so as to minimize a risk of compromise. For example, the extension 1130b and the proxy web 503b may be configured to pair e.g. by implementing a handshaking mechanism. For example, the extension 1130b and the proxy web 503b may be configured to perform handshakes. For example, the extension 1130b may be configured to periodically perform handshakes e.g. heartbeats with the proxy web 503b, to inform and/or confirm a normal status of the extension 1130b to the web proxy 503b. A heartbeat may be, for example, an encoded URL. A frequency of such heartbeats may be negotiated and/or defined by the extension 1130b and/or the proxy web 503b during an initial handshake. In this way, the web proxy 503b may determine if the heartbeats originate from the extension 1130 or if the heartbeats originate from another source e.g. malicious code, such as a man-in-the-middle attack. The web proxy 503b may be configured to deny all web requests in response to a missing and/or incorrect heartbeat. In this way, the computer device 700 may be better protected against malicious code.

It will be appreciated that the extension 1130b provided for the process 520b in the sandbox 950 may be similarly provided for the process 520, for example.

Figure 13:
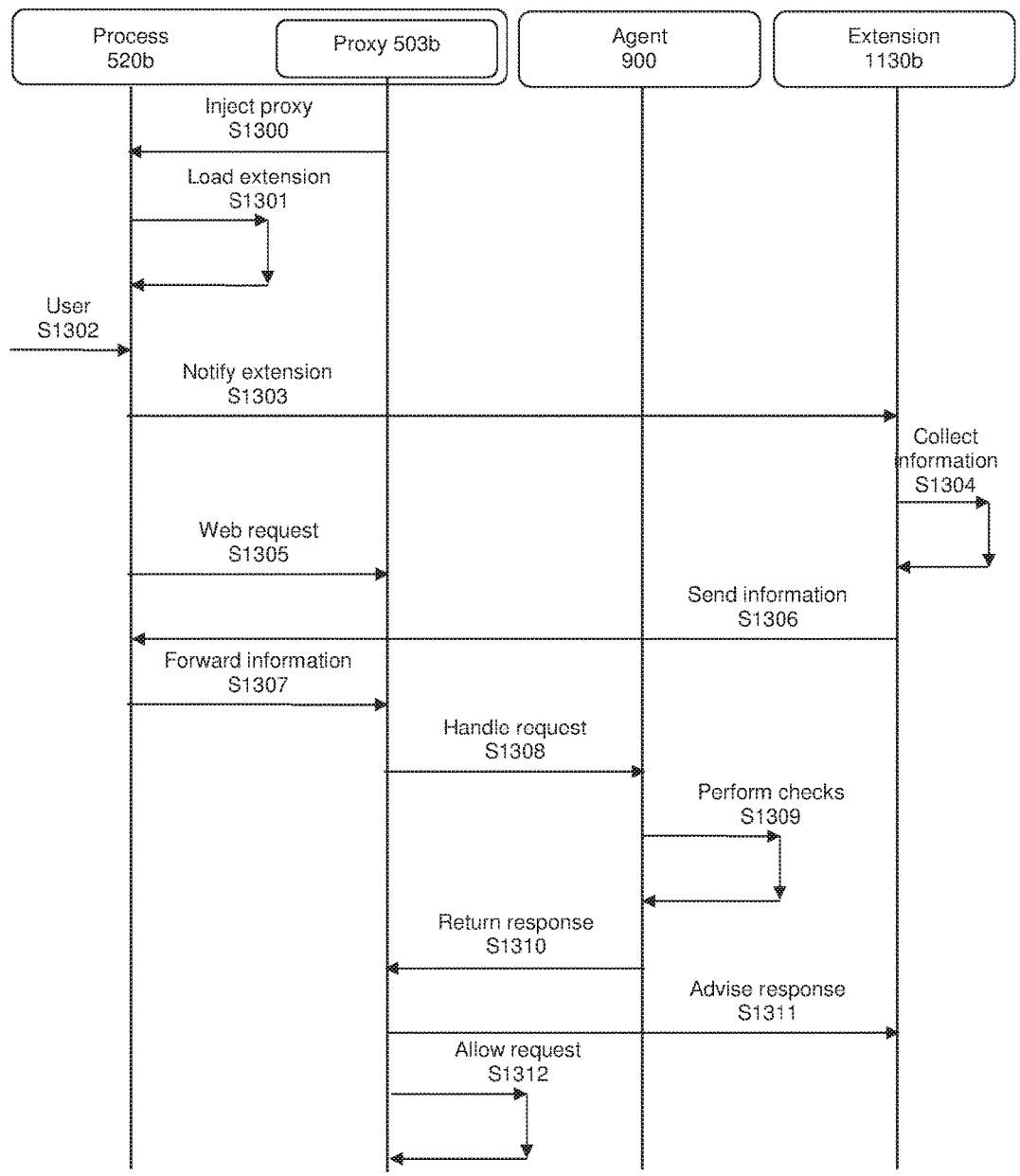
FIG. 13 is a flowchart of an example method of operating the computer device of FIG. 12.

FIG. 13 is a flowchart of an example method of operating the computer device 700, including an example mechanism to better control access the web resource 10 from the process 520b in the sandbox 950, according to the web proxy 503b. Particularly, this example mechanism relates to the agent 900 permitting or denying the web request according to the context information related to the web request collected by and received from the extension 1130b provided for the process 520b.

At S1300, the web proxy 503b is injected into the address space of the process 520b, as described previously. At S1301, the extension 1130b is loaded by the process 520b, for example, during loading/launching of the process 520b.

At S1302, the process receives a request for the web resource 10 e.g. from a user. Subsequently, at S1303, the process 520b notifies the extension 1130b of a web request for the web resource 10 by sending a message to the extension 1130b. In response, the extension 1130b collects context information related to the web request at S1304.

At S1305, the process 520b sends, via the private port, the web request for the web resource 10, which is received by the web proxy 503b. The web proxy 503b may wait to receive the context information collected by the extension 1130b. At S1306, the extension 1130b sends the collected context information to the process 520b, for example, as an encoded URL. At S1307, the process 520b forwards the collected context information to the web proxy 503b.

At S1308, the web proxy 503b handles the web request, which may include examining the web request, decoding the encoded URL, examining the collected context information and/or forwarding the web request and/or the collected context information to the agent 900.

At S1309, the agent 900 performs checks relating to the web request according to the connection origin and/or the URI 11 and/or the security context of the secondary primary user account 110b and/or the collected context information. According to a result of the checks, the agent 900 selectively permits or denies the web request, as described previously. The agent may, for example, create a new sandbox such that the web request may be satisfied in the new sandbox, as described previously. Hence, the agent 900 returns a response to the proxy 503b, running in the isolated process 520b in the sandbox 950, at S1310.

At S1311, the proxy 503b advises the extension 1130b of the response, such that the extension 1130b may inform the user appropriately of the response to the web request. For example, if the web request is to be satisfied in a new sandbox, the extension 1130b may close a page in the process 520b from which the web request was initiated by the user or replace the page with a new page e.g. a landing page, thereby cancelling the web request from the process 520b. Instead, the web request may be satisfied in the new sandbox by requesting the web resource 10 from the new sandbox.

Alternatively, if the returned response permits the web request, the web proxy 503b allows the web request, which is satisfied at S1312, as described previously.

Hence, according to this example mechanism, web requests originating from user accounts for web resources may be satisfied according to context information related to the web requests. In this way, the computer device 700 improves a user experience while being better protected from malicious content.

Figure 14:
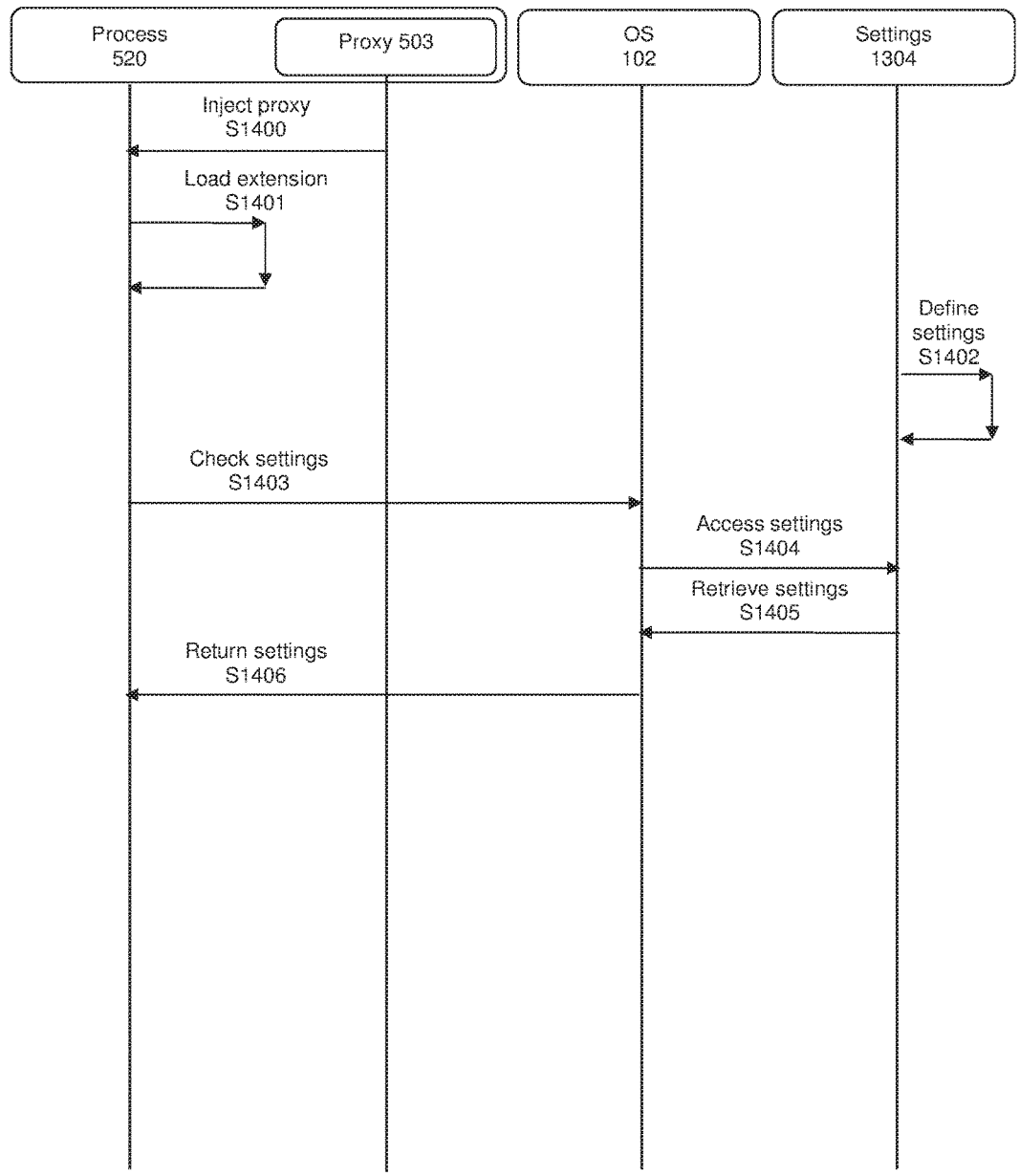
FIG. 14 is a flowchart of an example method of operating an example computer device.
Figure 15:
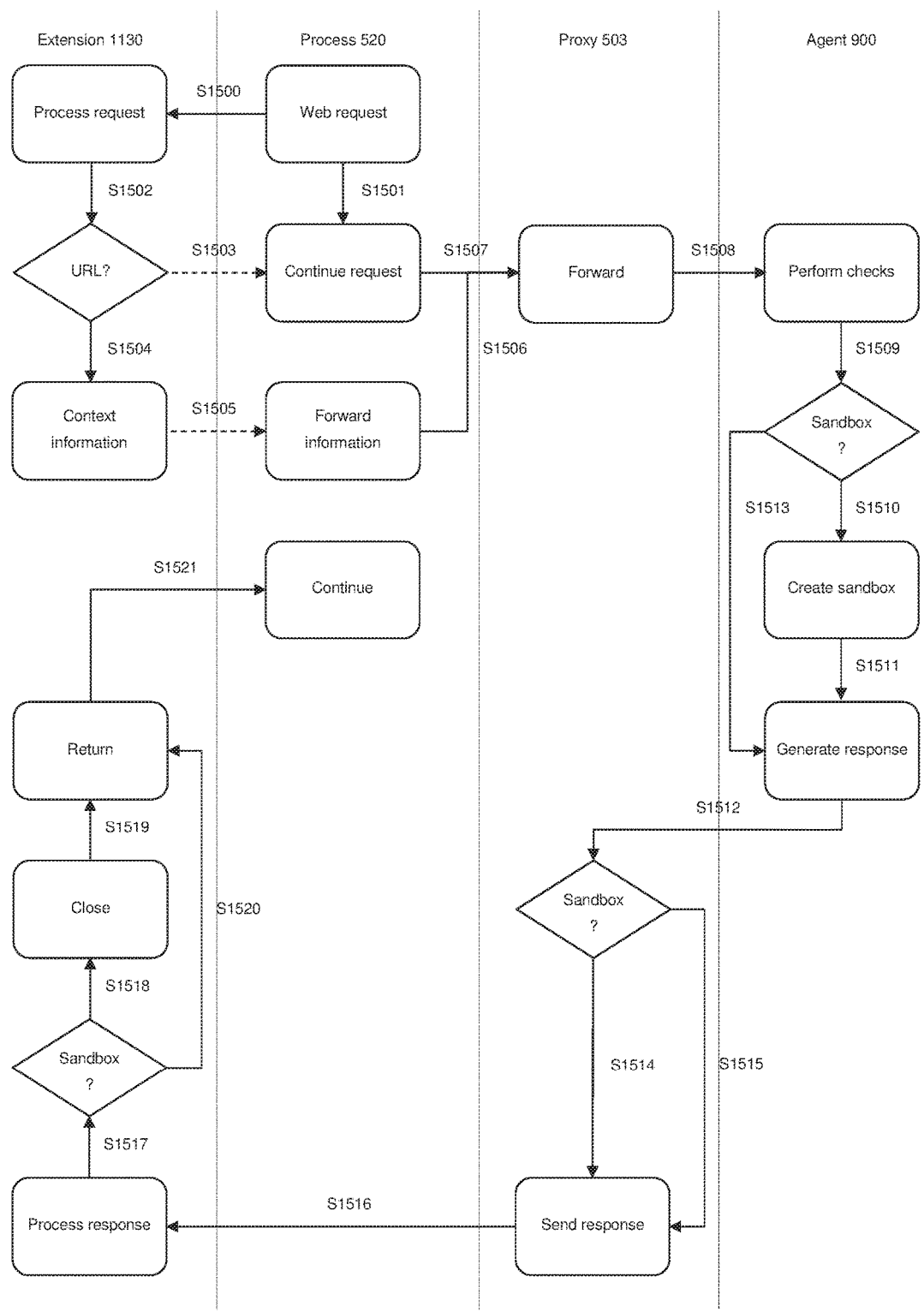
FIG. 15 is a flowchart of an example method of operating an example computer device.

FIGS. 14 & 15 show an example of a practical application of operating a computer device, such as the computer 700, including an example mechanism to better control access web resources (i.e. web resources 10) from a Google Chrome® browser (i.e. the process 520), according to the web proxy 503.

In detail, FIG. 14 is a flowchart of an example of a practical application of operating a computer device, such as the computer device 700. Particularly, this example mechanism relates to configuring the web proxy 503 to be accessed by the process 520.

At S1400, the web proxy 503, implemented as a WinSock based web proxy, is injected into the address space of the process 520, as described previously. At S1401, the extension 1130 is loaded by the process 520, for example, during loading/launching of the process 520. At S1402, the agent 900 defines web proxy settings 1304 (e.g. port, address) for the web proxy 503. In this way, the web proxy 503 may be registered as a local proxy for HTTP & HTTPS connections in the computer device 700. The web proxy 503 may provide socket tunnelling for secured HTTPS connections. The agent 900 may define same or different web proxy settings 1304 for different web proxies 503. For example, the agent 900 may define unique web proxy settings for the web proxy 503. In this way, the agent 900 may provide the web proxy settings 1304 only for the process 520 and thus only the process 520 may access the web proxy 503.

When the process 520 wants to connect to the Internet, for example, the process 520 checks with the operating system 102 if there are any web proxies (e.g. the web proxies 303-1-303-$n$) configured for the computer device 700. Thus, at S1403, the process 520 checks the web proxy settings of the web proxies with the operating system 102, for example, by calling a relevant API. In turn, at S1404, the operating system 102 accesses the web proxy settings. However, rather than retrieving, for example, the web proxy settings for the web proxies 303-1-303-$n$, the operating system 102 instead retrieves, at S1405, the web proxy settings 1304 for the web proxy 503 defined and provided by the agent 900. The web proxy settings 1304 for the web proxy 503 are hence returned to the process 520 at S1406.

Hence, the web proxy 503 behaves as a virtual first web proxy in a web proxy chain, even though the web proxy 303-1, for example, may be configured otherwise as a first web proxy in the web proxy chain. Thus, subsequent web requests from the process 520 are relayed first through the web proxy 503 (and hence the web proxy 303-1, for example) rather than first through the web proxy 303-1, for example.

In detail, FIG. 15 is a flowchart of an example of a practical application of operating a computer device, such as the computer 700. Particularly, this example mechanism relates to the agent 900 permitting or denying the web request according to the context information related to the web request collected by and received from the extension 1130 provided for the process 520$b$.

The user requests access to a website (e.g. www.onedrive.com) by, for example, typing a URI for the website into an address bar of a tab page of the browser (i.e. the process 520). At S1500, the process 520 notifies the extension 1130 of a web request and subsequently continues to process the web request, at S1501.

In response to the notification, at S1502 the extension 1130 determines if the user is requesting to navigate to a top frame URI. If the extension 1130 determines that the user is not requesting to navigate to a top frame URI, the extension 1130 relinquishes control to the process 520 at S1503, such that the process 520 continues to process the web request, as before. However, if the extension 1130 determines that the user is requesting to navigate to a top frame URI, the extension 1130 initiates communication with the web proxy 503, collects context information related to the web request and sends the context information (i.e. a payload) to the process 520 at S1505, requesting the process 520 to forward the payload to the web proxy 503. At S1506, the process 520 forwards the payload to the web proxy 503.

At S1507, the process 520 forwards the web request to the web proxy 503 and the web proxy 503 examines the web request.

The web proxy 503 forwards the web request to the agent 900 at S1508. The agent 900 performs checks and determines if a sandbox is required at S1509. For example, the agent 900 may identify the process 520 according to a TCP table stored by the operating system 102. In this way, a path of the process 520 initiating the web request may be obtained. Additionally and/or alternatively, a digital signature of the process 520 may be checked, in an event that a name of the process 520 has been modified (e.g. by another process). Additionally and/or alternatively, the agent 900 may identify the process 520 according to the 'User-Agent' string included in a header of the web request. Additionally and/or alternatively, the agent 900 may examine the context information related to the web request collected by the extension 1330 and forwarded to the agent 900 via the proxy 503. According to the context information as described previously, the agent 900 may determine whether the web request originated from a user or programmatically, for example.

If a sandbox is required, the agent 900 creates a sandbox at S1510 and hence generates a response for the web proxy 503 at S1511, which is returned to the web proxy 503 at S1512. If a sandbox is not required, the agent 900 generates a response for the web proxy 503 at S1513, which is returned to the web proxy 503 at S1512, as before.

If a sandbox is required, the proxy 503 prepares a response for the extension 1130 at S1514. However, if a sandbox is not required, the proxy 503 prepares a response for the extension 1130 at S1515. At S1516, the response is sent from the web proxy 503 to the extension 1130.

The extension 1130 processes the response at S1517 and if the web request is to be sandboxed, the extension 1130 closes the tab page at S1518 and relinquishes control to the process 520 at S1519. Alternatively, if the web request is not to be sandboxed, the extension 1130 relinquishes control to the process 520 at S1520. The control is hence relinquished to the process 520 at S1521, which continues normal workflow.

Hence, according to this practical application of operating the computer device, such as the computer 700, access to web resources may be better controlled by the web proxy 503 so as to better protect the computer device from malicious content while a user experience may be improved by using the context information collected by the extension 1130. At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A computer device comprising:
a hardware circuit including a processor circuit and a memory circuit, and configured to:
execute an operating system configured to access web resources in response to web requests;
allocate an address space to a user process in the memory circuit; and
insert a web proxy into the address space allocated to the user process, wherein the web proxy is configured to:
receive a web request for a web resource from the user process that has the web proxy inserted into the address space allocated to the user process;
determine a connection origin of the web request;
examine the web request for the web resource to selectively allow or deny access to the web resource based on the connection origin of the web request, wherein access to the web resource is denied when the connection origin indicates that the web request originated from a process other than the user process that has the web proxy inserted into the address space allocated to the user process; and
arrange access to the web resource, when the web request for the web resource is allowed.

2. The computer device according to claim 1, wherein the web proxy is configured to register with the user process as a first web proxy.

3. The computer device according to claim 1, wherein the web proxy is configured to be invisible to one or both of another user process configured to run on the computer device and another web proxy configured for the computer device.

4. The computer device according to claim 1, wherein the web proxy is configured to chain with another web proxy configured for the computer device; and
wherein access to the web resource is arranged through the chained web proxies.

5. The computer device according to claim 1, further comprising an agent configured to provide a sandbox, wherein the sandbox is configured to isolate untrusted content therein; and
wherein access to the web resource is arranged in the sandbox.

6. The computer device according to claim 1, further comprising an extension for the user process, wherein the extension is configured to cooperate with the web proxy.

7. The computer device according to claim 6, wherein the extension is configured to provide context information related to the web request to the web proxy; and
wherein the web proxy is configured to examine the request for the web resource to selectively allow or deny access to the web resource according to the context information related to the web request.

8. The computer device according to claim 6, wherein the web proxy and the extension are configured to perform handshakes.

9. The computer device according to claim 1, wherein the web proxy is further configured to selectively examine a URI provided in the web request for the web resource to selectively allow or deny access to the web resource according to the URI.

10. A method of controlling access to web resources on a computer device, the method being implemented by a hardware circuit of the computer device including at least a processor circuit and a memory circuit, the method comprising:
allocating an address space to a user process in the memory circuit;
inserting a web proxy into the address space allocated to the user process, wherein the web proxy is configured to receive web requests for web resources from the user process;
receiving, by the web proxy, a web request for a web resource from the user process;
determining, by the web proxy, a connection origin of the web request;
examining, by the web proxy, the web request for the web resource to selectively allow or deny access to the web resource based on the connection origin of the web request, wherein access to the web resource is denied when the connection origin indicates that the web request originated from a process other than the user process that has the web proxy inserted into the address space allocated to the user process; and
arranging, by the web proxy, access to the web resource, when the web request for the web resource is allowed.

11. The method according to claim 10, wherein the method further comprises:
registering, by the web proxy with the user process, as a first web proxy.

12. The method according to claim 10, wherein the web proxy is configured to be invisible to one or both of another user process configured to run on the computer device and another web proxy configured for the computer device.

13. The method according to claim 10 further comprising:
chaining, by the web proxy, with another web proxy configured for the computer device; and
wherein arranging, by the web proxy, access to the web resource, when the web request for the web resource is allowed is through the chained web proxies.

14. The method according to claim 10 further comprising:
providing, by an agent, a sandbox, wherein the sandbox is configured to isolate untrusted content therein; and
wherein arranging, by the web proxy, access to the web resource, when the web request for the web resource is allowed comprises arranging, by the web proxy, access to the web resource, when the web request for the web resource is allowed, in the sandbox.

15. The method according to claim 10 further comprising:
cooperating, by an extension provided for the user process, with the web proxy.

16. The method according to claim 15 further comprising:
providing, by the extension, context information related to the web request to the web proxy; and
wherein examining, by the web proxy, the web request for the web resource to selectively allow or deny access to the web resource comprises examining, by the web proxy, the web request for the web resource to selectively allow or deny access to the web resource according to the context information related to the web request.

17. The method according to claim 15 further comprising:
  performing, by the web proxy and the extension, handshakes.

18. The method according to claim 10, further comprising:
  examining, by the web proxy, a URI provided in the web request for the web resource to selectively allow or deny access to the web resource according to the URI.

19. A non-transitory computer readable storage medium having recorded thereon instructions which, when executed by a processor circuit of a computer device, cause the computer device to:
  allocate an address space for a user process;
  insert a web proxy in the allocated address space of the user process, wherein the web proxy is configured to receive web requests for web resources from the user process;
  receive, by the web proxy, a web request for a web resource from the user process;
  determine, by the web proxy, a connection origin of the web request;
  examine, by the web proxy, the web request for the web resource to selectively allow or deny access to the web resource based on the connection origin of the web request, wherein access to the web resource is denied when the connection origin indicates that the web request originated from a process other than the user process that has the web proxy inserted into the address space allocated to the user process; and
  arrange, by the web proxy, access to the web resource, when the web request for the web resource is allowed.

* * * * *